United States Patent
Miracle et al.

(10) Patent No.: US 10,472,595 B2
(45) Date of Patent: *Nov. 12, 2019

US010472595B2

(54) LEUCO POLYMERS AS BLUING AGENTS IN LAUNDRY CARE COMPOSITIONS

(71) Applicant: The Procter & Gamble Company, Cincinnati, OH (US)

(72) Inventors: Gregory Scot Miracle, Liberty Township, OH (US); Sanjeev Kumar Dey, Spartanburg, SC (US)

(73) Assignee: The Procter & Gamble Company, Cincinnati, OH (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/800,107

(22) Filed: Nov. 1, 2017

(65) Prior Publication Data

US 2018/0119062 A1     May 3, 2018

Related U.S. Application Data

(60) Provisional application No. 62/415,567, filed on Nov. 1, 2016.

(51) Int. Cl.

| | | |
|---|---|---|
| *C11D 1/00* | (2006.01) | |
| *C11D 3/30* | (2006.01) | |
| *C11D 3/37* | (2006.01) | |
| *C11D 3/40* | (2006.01) | |
| *C11D 3/42* | (2006.01) | |
| *C09B 11/00* | (2006.01) | |
| *C09B 11/04* | (2006.01) | |
| *C09B 11/10* | (2006.01) | |
| *C09B 69/10* | (2006.01) | |
| *C11D 3/00* | (2006.01) | |
| *C11D 3/18* | (2006.01) | |
| *C11D 3/20* | (2006.01) | |
| *C11D 3/26* | (2006.01) | |

(52) U.S. Cl.
CPC .............. *C11D 3/42* (2013.01); *C09B 69/103* (2013.01); *C11D 1/00* (2013.01); *C11D 3/0084* (2013.01); *C11D 3/187* (2013.01); *C11D 3/20* (2013.01); *C11D 3/26* (2013.01); *C11D 3/3723* (2013.01); *C11D 3/3749* (2013.01)

(58) Field of Classification Search
CPC ........... C11D 1/00; C11D 3/30; C11D 3/3723; C11D 3/40; C11D 3/42; C09B 11/00; C09B 11/04; C09B 11/10; C09B 69/10
See application file for complete search history.

(56) References Cited

U.S. PATENT DOCUMENTS

| | | |
|---|---|---|
| 3,341,539 A | 9/1967 | Staeuble et al. |
| 7,544,216 B2 | 6/2009 | Torres |
| 7,597,723 B2 | 10/2009 | Moore |
| 7,637,963 B2 | 12/2009 | Moore |
| 9,206,382 B2 | 12/2015 | Lant |
| 2015/0322384 A1* | 11/2015 | Butterfield ............... C11D 3/42 510/324 |
| 2016/0326467 A1* | 11/2016 | Qin ........................ C09B 11/06 |
| 2018/0119057 A1 | 5/2018 | Ditullio |
| 2018/0119058 A1 | 5/2018 | Miracle |
| 2018/0119059 A1 | 5/2018 | Miracle |
| 2018/0119060 A1 | 5/2018 | Miracle |
| 2018/0119061 A1 | 5/2018 | Miracle |
| 2018/0119062 A1 | 5/2018 | Miracle |
| 2018/0119063 A1 | 5/2018 | Miracle |
| 2018/0119064 A1 | 5/2018 | Miracle |
| 2018/0119065 A1 | 5/2018 | Miracle |
| 2018/0119066 A1 | 5/2018 | Miracle |
| 2018/0119067 A1 | 5/2018 | Miracle |
| 2018/0119068 A1 | 5/2018 | Miracle |
| 2018/0119069 A1 | 5/2018 | Miracle |
| 2018/0119070 A1 | 5/2018 | Miracle |
| 2018/0155656 A1 | 6/2018 | Miracle et al. |

FOREIGN PATENT DOCUMENTS

| | | |
|---|---|---|
| CN | 101600765 B | 7/2014 |
| EP | 2491105 B1 | 12/2014 |
| EP | 2683775 B1 | 12/2014 |
| EP | 2852638 B1 | 10/2015 |
| EP | 2852639 B1 | 10/2015 |
| EP | 2573144 B1 | 6/2016 |
| IN | 268918 B | 9/2015 |
| WO | WO2008100445 A2 | 8/2008 |
| WO | WO2016178668 A1 | 11/2016 |

OTHER PUBLICATIONS

International Search Report; International Application No. PCT/US2017/059419; dated Feb. 2, 2018; 12 pages.

* cited by examiner

*Primary Examiner* — Brian P Mruk
(74) *Attorney, Agent, or Firm* — John T. Dipre

(57) ABSTRACT

A leuco polymer comprising a polyethylenimine and at least one leuco moiety covalently bound to the polyethylenimine, wherein the polyethylenimine comprises three or more amine nitrogen atoms and 1 mol. % or more of amine hydrogen atoms in the polyethylenimine are replaced with a moiety selected from the group consisting of 2-hydroxypropyl, 1-hydroxypropane-2-yl, and polyalkoxy groups. Methods of making the leuco polymer, laundry care compositions comprising the leuco polymer and methods of treating textiles with such laundry care compositions.

6 Claims, No Drawings

LEUCO POLYMERS AS BLUING AGENTS IN LAUNDRY CARE COMPOSITIONS

TECHNICAL FIELD

This application describes laundry care compositions that contain leuco colorants and their use in the laundering of textile articles. These types of colorants are provided in a stable, substantially colorless state and then may be transformed to an intense colored state upon exposure to certain physical or chemical changes such as, for example, exposure to oxygen, ion addition, exposure to light, and the like. The laundry care compositions containing the leuco colorants are designed to enhance the apparent or visually perceived whiteness of, or to impart a desired hue to, textile articles washed or otherwise treated with the laundry care composition.

BACKGROUND

As textile substrates age, their color tends to fade or yellow due to exposure to light, air, soil, and natural degradation of the fibers that comprise the substrates. As such, to visually enhance these textile substrates and counteract the fading and yellowing the use of polymeric colorants for coloring consumer products has become well known in the prior art. For example, it is well known to use whitening agents, either optical brighteners or bluing agents, in textile applications. However, traditional whitening agents when used at levels providing consumer noticeable whiteness benefits may either adversely impact finished product aesthetics, or if highly depositing, have issues with build up over time and over hueing.

Leuco dyes are also known in the prior art to exhibit a change from a colorless or slightly colored state to a colored state upon exposure to specific chemical or physical triggers. The change in coloration that occurs is typically visually perceptible to the human eye. All existing compounds have some absorbance in the visible light region (400-750 nm), and thus more or less have some color. In this invention, a dye is considered as a "leuco dye" if it did not render a significant color at its application concentration and conditions, but renders a significant color in its triggered form. The color change upon triggering stems from the change of the molar attenuation coefficient (also known as molar extinction coefficient, molar absorption coefficient, and/or molar absorptivity in some literatures) of the leuco dye molecule in the 400-750 nm range, preferably in the 500-650 nm range, and most preferably in the 530-620 nm range. The increase of the molar attenuation coefficient of a leuco dye before and after the triggering should be bigger than 50%, more preferably bigger than 200%, and most preferably bigger than 500%.

As such, there remains a need for an effective whitening agent that deposits to provide the desired whiteness benefit yet does not adversely impact finished product aesthetics or cause over hueing after multiple washes.

It has now surprisingly been found that the presently claimed leuco polymers provide the desired consumer whiteness benefit, without adverse effects.

SUMMARY OF THE INVENTION

In a first embodiment, the invention provides a laundry care composition comprising: (i) from 2 to 70 wt % of a surfactant; and (ii) from 0.0001 to 20.0 wt % of a leuco polymer comprising a polyamine covalently bound to a leuco moiety, said leuco polymer obtainable by reacting a first compound with a second compound, said first compound comprising a leuco moiety and an electrophilic moiety, said second compound selected from the group consisting of polyamines In a second embodiment, the invention provides a domestic method of treating a textile material, the method comprising the steps of (a) treating the textile material with an aqueous solution of the leuco polymer, (b) optionally, rinsing the textile material, and (c) drying the textile material.

It is believed that leuco polymers comprising leuco moieties bound to polyamine polymers deposit well to consumer fabrics.

DETAILED DESCRIPTION

Definitions

As used herein, the term "alkoxy" is intended to include $C_1$-$C_8$ alkoxy and alkoxy derivatives of polyols having repeating units such as butylene oxide, glycidol oxide, ethylene oxide or propylene oxide.

As used herein, the interchangeable terms "alkyleneoxy" and "oxyalkylene," and the interchangeable terms "polyalkyleneoxy" and "polyoxyalkylene," generally refer to molecular structures containing one or more than one, respectively, of the following repeating units: —$C_2H_4O$—, —$C_3H_6O$—, —$C_4H_8O$—, and any combinations thereof. Non-limiting structures corresponding to these groups include —$CH_2CH_2O$—, —$CH_2CH_2CH_2O$—, —$CH_2CH_2CH_2CH_2O$—, —$CH_2CH(CH_3)O$—, and —$CH_2CH(CH_2CH_3)O$—, for example. Furthermore, the polyoxyalkylene constituent may be selected from the group consisting of one or more monomers selected from a $C_{2-20}$ alkyleneoxy group, a glycidyl group, or mixtures thereof.

The terms "ethylene oxide," "propylene oxide" and "butylene oxide" may be shown herein by their typical designation of "EO," "PO" and "BO," respectively.

As used herein, the terms "alkyl" and "alkyl capped" are intended to mean any univalent group formed by removing a hydrogen atom from a substituted or unsubstituted hydrocarbon. Non-limiting examples include hydrocarbyl moieties which are branched or unbranched, substituted or unsubstituted including $C_1$-$C_{18}$ alkyl groups, and in one aspect, $C_1$-$C_6$ alkyl groups.

As used herein, unless otherwise specified, the term "aryl" is intended to include $C_3$-$C_{12}$ aryl groups. The term "aryl" refers to both carbocyclic and heterocyclic aryl groups.

As used herein, the term "alkaryl" refers to any alkyl-substituted aryl substituents and aryl-substituted alkyl substituents. More specifically, the term is intended to refer to $C_{7-16}$ alkyl-substituted aryl substituents and $C_{7-16}$ aryl substituted alkyl substituents which may or may not comprise additional substituents.

As used herein, the term "detergent composition" is a sub-set of laundry care composition and includes cleaning compositions including but not limited to products for laundering fabrics. Such compositions may be pre-treatment composition for use prior to a washing step or may be rinse added compositions, as well as cleaning auxiliaries, such as bleach additives and "stain-stick" or pre-treat types.

As used herein, the term "laundry care composition" includes, unless otherwise indicated, granular, powder, liquid, gel, paste, unit dose, bar form and/or flake type washing agents and/or fabric treatment compositions, including but not limited to products for laundering fabrics, fabric softening compositions, fabric enhancing compositions, fabric freshening compositions, and other products for the care and maintenance of fabrics, and combinations thereof. Such compositions may be pre-treatment compositions for use prior to a washing step or may be rinse added compositions, as well as cleaning auxiliaries, such as bleach additives and/or "stain-stick" or pre-treat compositions or substrate-laden products such as dryer added sheets.

As used herein, the term "leuco" (as used in reference to, for example, a compound, moiety, radical, dye, monomer, fragment, or polymer) refers to an entity (e.g., organic compound or portion thereof) that, upon exposure to specific chemical or physical triggers, undergoes one or more chemical and/or physical changes that results in a shift from a first color state (e.g., uncolored or substantially colorless) to a second more highly colored state. Suitable chemical or physical triggers include, but are not limited to, oxidation, pH change, temperature change, and changes in electromagnetic radiation (e.g., light) exposure. Suitable chemical or physical changes that occur in the leuco entity include, but are not limited to, oxidation and non-oxidative changes, such as intramolecular cyclization. Thus, in one aspect, a suitable leuco entity can be a reversibly reduced form of a chromophore. In one aspect, the leuco moiety preferably comprises at least a first and a second π-system capable of being converted into a third combined conjugated π-system incorporating said first and second π-systems upon exposure to one or more of the chemical and/or physical triggers described above.

As used herein, the terms "leuco composition" or "leuco colorant composition" refers to a composition comprising at least two leuco compounds having independently selected structures as described in further detail herein.

As used herein "average molecular weight" of the leuco colorant is reported as a weight average molecular weight, as determined by its molecular weight distribution: as a consequence of their manufacturing process, the leuco colorants disclosed herein may contain a distribution of repeating units in their polymeric moiety.

As used herein, the terms "maximum extinction coefficient" and "maximum molar extinction coefficient" are intended to describe the molar extinction coefficient at the wavelength of maximum absorption (also referred to herein as the maximum wavelength), in the range of 400 nanometers to 750 nanometers.

As used herein, the term "first color" is used to refer to the color of the laundry care composition before triggering, and is intended to include any color, including colorless and substantially colorless.

As used herein, the term "second color" is used to refer to the color of the laundry care composition after triggering, and is intended to include any color that is distinguishable, either through visual inspection or the use of analytical techniques such as spectrophotometric analysis, from the first color of the laundry care composition.

As used herein, the term "converting agent" refers to any oxidizing agent as known in the art other than molecular oxygen in any of its known forms (singlet and triplet states).

As used herein, the term "triggering agent" refers to a reactant suitable for converting the leuco composition from a colorless or substantially colorless state to a colored state.

As used herein, the term "whitening agent" refers to a dye or a leuco colorant that may form a dye once triggered that when on white cotton provides a hue to the cloth with a relative hue angle of 210 to 345, or even a relative hue angle of 240 to 320, or even a relative hue angle of 250 to 300 (e.g., 250 to 290).

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, articles such as "a" and "an" when used in a claim, are understood to mean one or more of what is claimed or described.

As used herein, the terms "include/s" and "including" are meant to be non-limiting.

As used herein, the term "solid" includes granular, powder, bar and tablet product forms.

As used herein, the term "fluid" includes liquid, gel, paste and gas product forms.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

As used herein, the term "nucleophile" refers to an organic compound comprising at least one nucleophilic moiety.

As used herein, the term "nucleophilic moiety" is the part of an organic compound that provides a pair of electrons to form a new covalent bond. Preferred nucleophilic moieties are portions of organic compounds wherein a resonance structure can be drawn that places a pair of electrons on one of the following atoms: carbon, nitrogen, oxygen, or sulfur. Suitable nucleophilic moieties include but are not limited to a primary amine, a secondary amine, a tertiary amine, a hydroxy group, a sulfhydryl group, an enolate, and an eneamine As used herein, the term "electrophile" refers to an organic compound comprising at least one electrophilic moiety.

As used herein, the term "electrophilic moiety" is the part of an organic compound that accepts a pair of electrons to form a new covalent bond.

As used herein, the term "leuco polymer" refers to an oligomeric or polymeric compound comprising at least one leuco moiety.

As used herein, the term "reactive leuco compound(s)" refers to a compound comprising at least one reactive moiety covalently bound to the leuco moiety. A compound that comprises at least one leuco moiety and at least one electrophilic group is an equivalent description of a "reactive leuco compound(s)" and is used interchangeably herein.

In one aspect, the molar extinction coefficient of said second colored state at the maximum absorbance in the wavelength in the range 200 to 1,000 nm (more preferably 400 to 750 nm) is preferably at least five times, more preferably 10 times, even more preferably 25 times, most preferably at least 50 times the molar extinction coefficient of said first color state at the wavelength of the maximum absorbance of the second colored state. Preferably, the molar extinction coefficient of said second colored state at the maximum absorbance in the wavelength in the range 200 to 1,000 nm (more preferably 400 to 750 nm) is at least five times, preferably 10 times, even more preferably 25 times, most preferably at least 50 times the maximum molar extinction coefficient of said first color state in the corresponding wavelength range. An ordinarily skilled artisan will realize that these ratios may be much higher. For example, the first color state may have a maximum molar extinction coefficient in the wavelength range from 400 to 750 nm of as little as 10 $M^{-1}cm^{-1}$, and the second colored state may have a maximum molar extinction coefficient in the wavelength range from 400 to 750 nm of as much as 80,000 $M^{-1}cm^{-1}$ or more, in which case the ratio of the extinction coefficients would be 8,000:1 or more.

In one aspect, the maximum molar extinction coefficient of said first color state at a wavelength in the range 400 to 750 nm is less than 1000 $M^{-1}cm^{-1}$, and the maximum molar extinction coefficient of said second colored state at a wavelength in the range 400 to 750 nm is more than 5,000 $M^{-1}cm^{-1}$, preferably more than 10,000, 25,000, 50,000 or even 100,000 $M^{-1}cm^{-1}$. A skilled artisan will recognize and appreciate that a polymer comprising more than one leuco moiety may have a significantly higher maximum molar extinction coefficient in the first color state (e.g., due to the additive effect of a multiplicity of leuco moieties or the presence of one or more leuco moieties converted to the second colored state). Where more than one leuco moiety is attached to a molecule, the maximum molar extinction coefficient of said second color state may be more than n×□ where n is the number of leuco moieties plus oxidized leuco moieties present on the molecule, and □ is selected from 5,000 $M^{-1}cm^{-1}$, preferably more than 10,000, 25,000, 50,000 or even 100,000 $M^{-1}cm^{-1}$. Thus for a molecule that has two leuco moieties, the maximum molar extinction coefficient of said second color state may be more than 10,000 $M^{-1}cm^{-1}$, preferably more than 20,000, 50,000, 100,000 or even 200,000 $M^{-1}cm^{-1}$. While n could theoretically be any integer, one skilled in the art appreciates that n will typically be from 1 to 100, more preferably 1 to 50, 1 to 25, 1 to 10 or even 1 to 5.

In one preferred embodiment, the leuco entity upon conversion to the second more highly colored state provides to white substrates a color with a relative hue angle of 210 to 345, or even a relative hue angle of 240 to 320, or even a relative hue angle of 250 to 300 (e.g., 250 to 290). The relative hue angle can be determined by any suitable method as known in the art. However, preferably it may be determined as described in further detail herein with respect to deposition of the leuco entity on cotton relative to cotton absent any leuco entity.

The present invention relates to a class of leuco colorants that may be useful for use in laundry care compositions, such as liquid laundry detergent, to provide a blue hue to whiten textile substrates. Leuco colorants are compounds that are essentially colorless or only lightly colored but are capable of developing an intense color upon activation. One advantage of using leuco compounds in laundry care compositions is that such compounds, being colorless until activated, allow the laundry care composition to exhibit its own color. The leuco colorant generally does not alter the primary color of the laundry care composition. Thus, manufacturers of such compositions can formulate a color that is most attractive to consumers without concern for added ingredients, such as bluing agents, affecting the final color value of the composition.

As noted above, in a first embodiment, the invention provides a leuco polymer comprising a polyamine covalently bound to a leuco moiety.

The polyamine of the leuco polymer can be any suitable polyamine The polyamines are polyalkyl amines and are generally linear or branched. The amines may be primary, secondary or tertiary. Suitable polyamines include, but are not limited to, polyethyleneimine, polypropyleneimine, and polyvinylamine Preferably the alkyl groups are ethylene and the polymer is formed by ring opening polymerization of ethyleneimine to provide polyethyleneimine (PEI). Polyethyleneimine (PEI) in one aspect is preferred.

In another aspect, preferably the polyamines are ethoxylated to provide, for example, ethoxylated polyethyleneimine (EPEI). In this regard, a single or a number of amine functions are reacted with one or more alkylene oxide groups to form a polyalkylene oxide side chain. The alkylene oxide can be a homopolymer (for example ethylene oxide) or a random or block copolymer.

The polyethyleneimines (PEIs) suitable for use in the detergent compositions of the present invention can have the general formula: $(-NHCH_2CH_2-)_x[-N(CH_2CH_2NH_2)CH_2CH_2-]_y$, wherein x is an integer from about 1 to about 120000, preferably from about 2 to about 60000, more preferably from about 3 to about 24000 and y is an integer from about 1 to about 60000, preferably from about 2 to about 30000, more preferably from about 3 to about 12000. Specific non-limiting examples of polyethylene imines are PEI-3, PEI-7, PEI-15, PEI-30, PEI-45, PEI-100, PEI-300, PEI-500, PEI 600, PEI-700, PEI-800, PEI-1000, PEI-1500, PEI-1800, PEI-2000, PEI-2500, PEI-5000, PEI-10000, PEI-25000, PEI 50000, PEI-70000, PEI-500000, PEI-5000000 and the like, wherein the integer represents the average molecular weight of the polymer. PEIs which are designated as such are available through Aldrich.

Most preferably the polyamine (e.g., PEI), before alkoxylation and/or reaction with a compound comprising a leuco moiety and a reactive group, has an average molecular weight of from 400 to 8000.

PEIs are usually highly branched polyamines characterized by the empirical formula $(C_2H_5N)_n$ with a molecular mass of 43.07 (as repeating units). They are commercially prepared by acid-catalyzed ring opening of ethyleneimine, also known as aziridine. (The latter, ethyleneimine, is prepared through the sulphuric acid esterification of ethanolamine)

PEIs are commercially available from the BASF Corporation under the trade name Lupasol® (also sold as Polymin®). These compounds can be prepared with a wide range of molecular weights and product activities. Examples of commercial PEIs sold by BASF that are suitable for use in the present invention include, but are not limited to, Lupasol FG®, Lupasol G-35®, Lupasol p®, Lupasol-P S Lupasol-(Water-Free)® and the like.

The amine groups of PEI exist mainly as a mixture of primary, secondary and tertiary groups in the ratio of about 1:11 to about 1:21 with branching every 3 to 3.5 nitrogen atoms along a chain segment. Because of the presence of amine groups, PEI can be protonated with acids to form a PEI salt from the surrounding medium resulting in a product that is partially or fully ionized depending on pH. For example, about 73% of PEI is protonated at pH 2, about 50% of PEI is protonated at pH 4, about 33% of PEI is protonated at pH 5, about 25% of PEI is protonated at pH 8 and about 4% of PEI is protonated at pH 10. Therefore, since the laundry care compositions of the present invention may exhibit a pH of about 6 to about 11, one would expect the PEI to be about 4-30% protonated and about 70-96% unprotonated.

In general, PEIs can be purchased as their protonated or unprotonated form with and without water. When protonated PEIs are formulated in the compositions of the present invention they are deprotonated to a certain extent by adding a sufficient amount of suitable base. The deprotonated form of PEI is the preferred form, however moderate amounts of protonated PEI can be used and do not significantly detract from the present invention.

The PEI is preferably alkoxylated, most preferably ethoxylated. The PEI is partially alkoxylated so that at least one $NH_2$ or NH is available for reaction with the reactive leuco compound, preferably at least one $NH_2$. In one embodiment, the preferred degree of alkoxylation is from 0.2 to 50% of the total of all amine hydrogens in the polyamine (e.g., PEI). In one embodiment, the preferred degree of alkoxylation is from 0.2 to 50% of the total of all primary and secondary amines in the polyamine (e.g., PEI). In one embodiment, the preferred degree of alkoxylation is from 60 to 100%, preferably 75 to 98%, of the total of all amine hydrogens in the polyamine (e.g., PEI). In one embodiment, the preferred degree of alkoxylation is from 60 to 100%, preferably 75 to 98%, of the total of all primary and secondary amines in the polyamine (e.g., PEI). Preferably, the alkoxylated groups of the polylalkoxylkated polyamine are selected from: ethoxy; and propoxy, most preferably the alkoxylated groups are polyalkylene oxide chains having repeat units of alkoxy moieties in the range from 5 to 30.

In one aspect, the polyamine is a polyalkoxylated polyamine A polylalkoxylkated polyamine is an organic compound that comprises alkoxylated amines and has at least one primary or secondary amine The primary or secondary amine present is required in order to permit the formation of a covalent bond with a leuco moiety via the reaction of said polyamine with a reactive leuco compound (e.g., a compound comprising a leuco moiety and an electrophilic moiety). Polyalkoxylated polyamines may be formed by different processes. Preferred polyalkoxylated polyamines are: polyethyleneimine, polypropyleneimine and polyvinylamine that are polyalkoxylated, preferably polyethoxylated or polypropoxylated. Most preferably the polyalkoxylated polyamines is a polyalkoxylated polyethylene imine, such as an ethoxylated polyethyleneimine (EPEI) polymers.

Polyethyleneimine (PEI) polymers are formed by ring opening polymerisation of ethyleneimine, the PEIs are then alkoxylated. In this regard, a single or a number of amine functions are reacted with one or more alkylene oxide groups to form a polyalkylene oxide side chain. The alkylene oxide can be a homopolymer (for example ethylene oxide) or a random or block copolymer.

As discussed above, the core polyamine forms a polylalkoxylkated polyamine The alkoxy groups are preferably selected from ethoxy and propoxy groups and preferably are polyalkylene oxide chains having repeat units of alkoxy moieties in the range from 5 to 30, preferably 12 to 22.

The polyalkylimine core, preferably PEI, of the polymer preferably has a weight average molecular weight of 200-60000, more preferably 400-2000, most preferably 500-1000. The polyalkylimine core may be branched or linear, preferably branched. The molecular weights can be determined by dynamic light scattering using a Zetasizer Nano (Malvern).

Suitable PEIs and EPEIs for reacting with reactive dyes are found in: WO2007/083262; WO 2006/113314; EP760846; U.S. Pat. No. 4,597,898; WO 2009/060409; WO 2008/114171; WO 2008/007320; EP 760846; WO 2009/065738; WO 2009/060409; WO 2005/063957; EP 996701; EP 918837; EP 917562; EP 907703; and, U.S. Pat. No. 6,156,720.

An example PEI core is shown below:

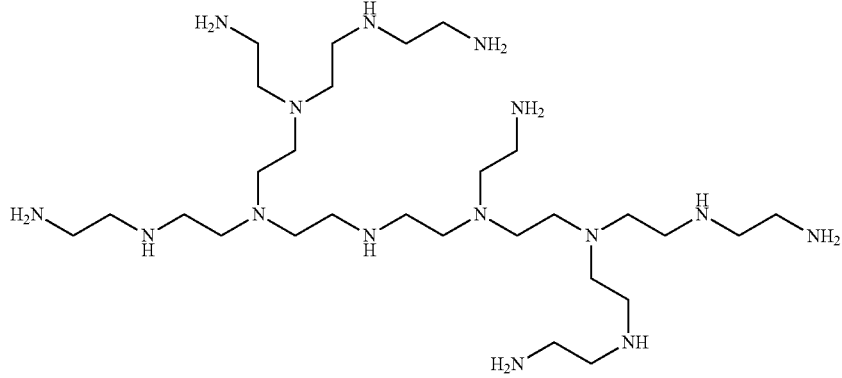 [SMILES: NCCNCCN(CCN)CCN(CCNCCN)CCNCCN(CCN)CCN(CCNCCN)CCNCCN]

The polymer core contains 15 Nitrogens of which six are primary amines (—NH$_2$); five are secondary amines (—NH—) and four are tertiary amines After ethoxylation and leuco attachment the leuco polymer may be of the following structure:

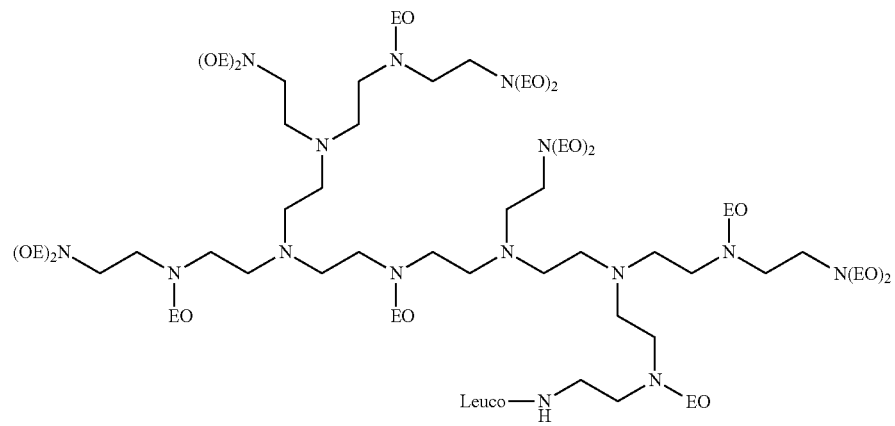

in which EO independently represents an ethoxylate group with an unspecified number of repeating units.

In the leuco polymer, 10 of the primary and secondary amines of the core PEI now carry an ethoxy group, which is (10/11)×100%=90.90 mol % (2 decimal places). One of the original group of 11 primary and secondary amines is now bound to a leuco moiety, in this case a primary amine has reacted with the compound comprising a leuco moiety and an electrophilic moiety, which is 1/11*100=9.09 mol % (2 decimal places).

Further Illustrative Examples are:

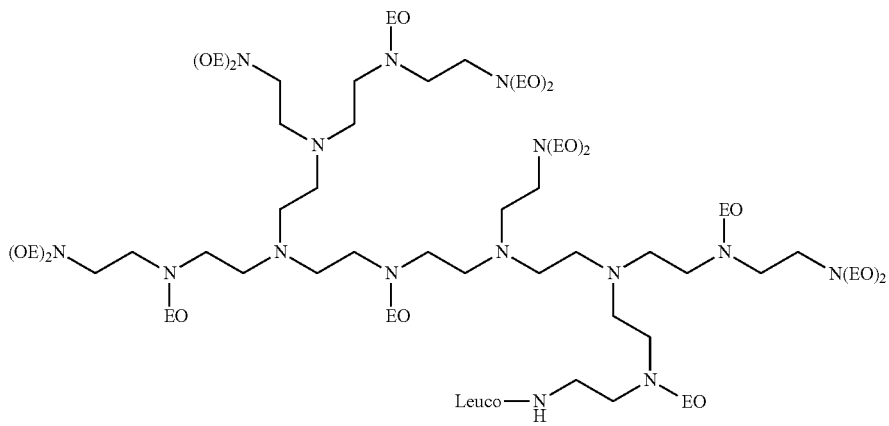

In which 11 out of 11 of the primary and secondary amines of the core PEI are ethoxylated, which is 100 mol %, 1 out of 11 of the primary and secondary amines of the core PEI are bound to a leuco moiety which is 9.09 mol % (2 decimal places).

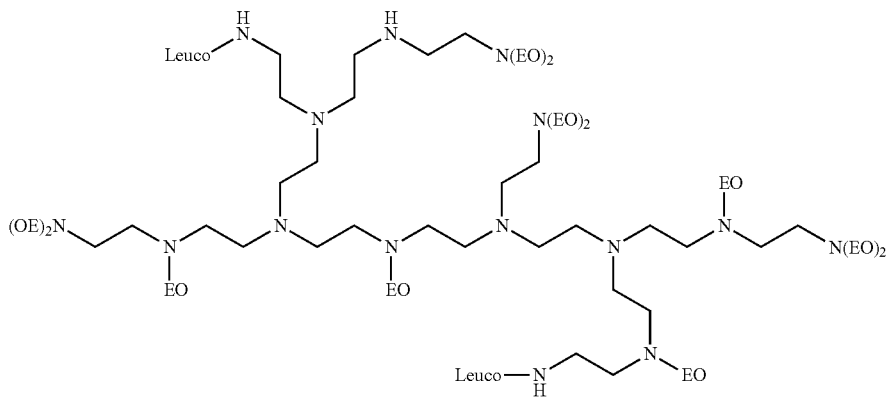

In which 8 out of 11 of the primary and secondary amines of the core PEI are ethoxylated, which is 72.73 mol % (2 decimal places); 2 out of 11 of the primary and secondary amines of the core PEI are bound to a leuco moiety which is 18.18 mol % (2 decimal places).

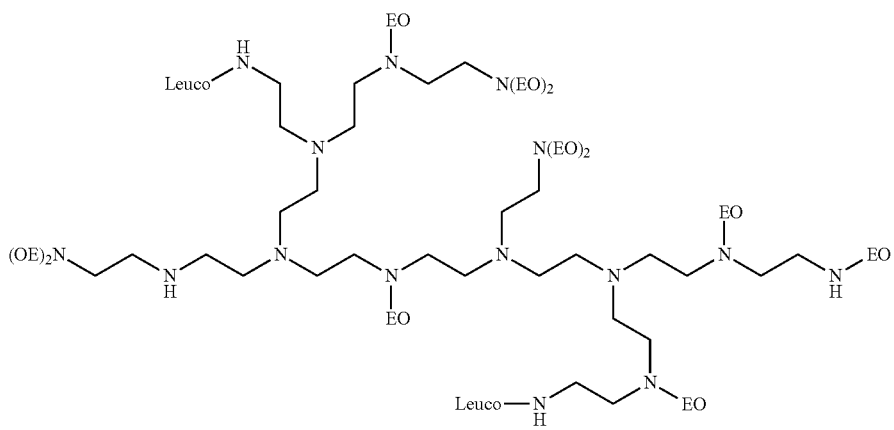

in which 7 out of 11 of the primary and secondary amines of the core PEI are ethoxylated, which is 63.63 mol % (2 decimal places); 2 out of 11 of the primary and secondary amines of the core PEI are bound to a leuco moiety which is 18.18 mol % (2 decimal places).

The structure and ratios of groups can be determined by NMR measurements.

When the polyamine is referred to as being covalently bound to a leuco moiety, one skilled in the art will understand that the original reactive, electrophilic group of the reactive leuco compound is not present in the leuco polymer. This is exemplified below for four reactive groups:

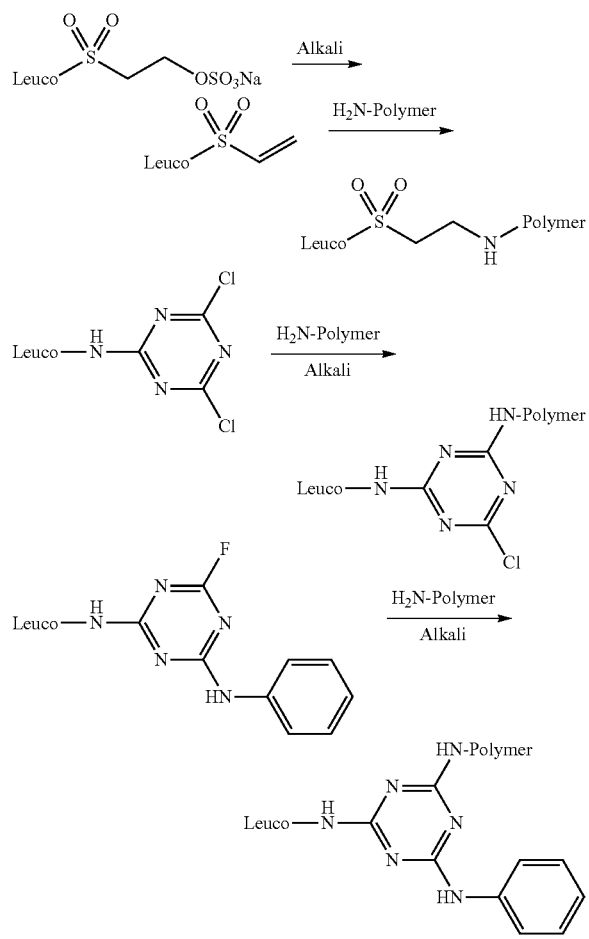

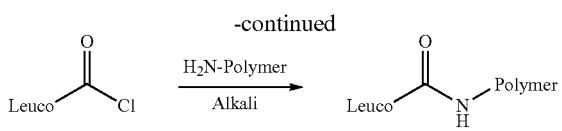

The leuco moiety covalently bound to the polyamine can be any suitable leuco moiety. Suitable leuco moieties include, but are not limited to, diarylmethane leuco moieties, triarylmethane leuco moieties, oxazine moieties, thiazine moieties, hydroquinone moieties, and arylaminophenol moieties. Thus, in one aspect, the leuco moiety is selected from the group consisting of diarylmethane leuco moieties, triarylmethane leuco moieties, oxazine moieties, thiazine moieties, hydroquinone moieties, arylaminophenol moieties, and mixtures thereof.

Suitable diarylmethane leuco moieties for use herein include, but are not limited to, univalent or polyvalent diarylmethylene moieties capable of forming a second colored state as described herein. Suitable examples include, but are not limited to, moieties derived from Michler's methane, a diarylmethylene substituted with an —OH group (e.g., Michler's hydrol) and ethers and esters thereof, a diarylmethylene substituted with a photocleavable group, such as a —CN group (bis(para-N,N-dimethyl)phenyl)acetonitrile), and similar such moieties.

In a more particular aspect, the leuco moiety is a univalent or polyvalent moiety derived by removal of one or more hydrogen atoms from a structure of Formula (I), (II), (III), (IV), or (V) described below:

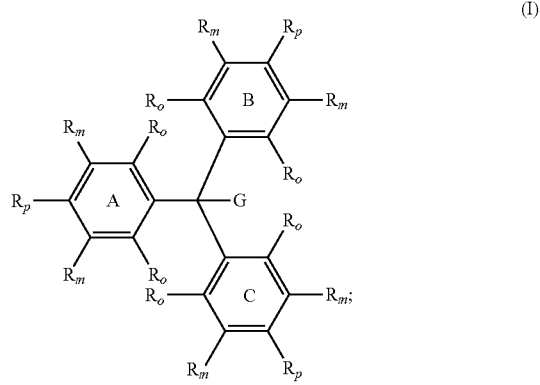

-continued

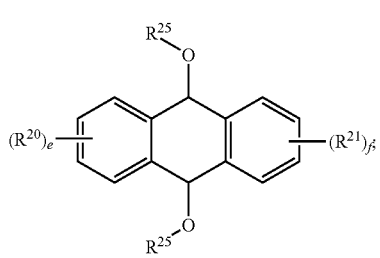
(II)

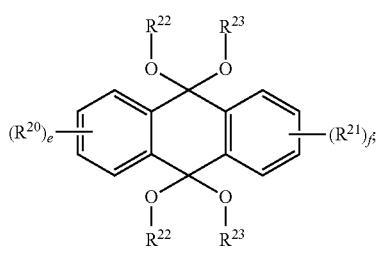
(III)

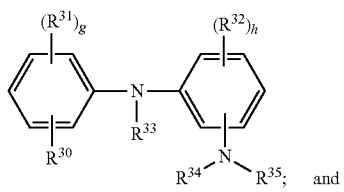
(IV)

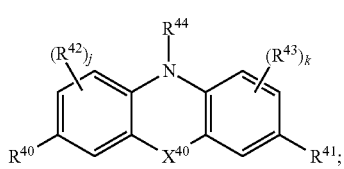
(V)

wherein the ratio of Formula I-V to its oxidized form is at least 1:19, 1:9, or 1:3, preferably at least 1:1, more preferably at least 3:1, most preferably at least 9:1 or even 19:1.

In the structure of Formula (I), each individual $R_o$, $R_m$ and $R_p$ group on each of rings A, B and C is independently selected from the group consisting of hydrogen, deuterium and $R^5$; each $R^5$ is independently selected from the group consisting of halogens, nitro, alkyl, substituted alkyl, aryl, substituted aryl, alkaryl, substituted alkaryl, —$(CH_2)_n$—O—$R^1$, —$(CH_2)_n$—$NR^1R^2$, —$C(O)R^1$, —$C(O)OR^1$, —$C(O)O^-$, —$C(O)NR^1R^2$, —$OC(O)R^1$, —$OC(O)OR^1$, —$OC(O)NR^1R^2$, —$S(O)_2R^1$, —$S(O)_2OR^1$, —$S(O)_2O^-$, —$S(O)_2NR^1R^2$, —$NR^1C(O)R^2$, —$NR^1C(O)OR^2$, —$NR^1C(O)SR^2$, —$NR^1C(O)NR^2R^3$, —$OR^1$, —$NR^1R^2$, —$P(O)_2R^1$, —$P(O)(OR^1)_2$, —$P(O)(OR^1)O^-$, and —$P(O)(O^-)_2$, wherein the index n is an integer from 0 to 4, preferably from 0 to 1, most preferably 0; wherein two $R_o$ on different A, B and C rings may combine to form a fused ring of five or more members; when the fused ring is six or more members, two $R_o$ on different A, B and C rings may combine to form an organic linker optionally containing one or more heteroatoms; in one embodiment two $R_o$ on different A, B and C rings combine to form a heteroatom bridge selected from —O— and —S— creating a six member fused ring; an $R_o$ and $R_m$ on the same ring or an $R_m$ and $R_p$ on the same ring may combine to form a fused aliphatic ring or fused aromatic ring either of which may contain heteroatoms; on at least one of the three rings A, B or C, preferably at least two, more preferably at least three, most preferably all four of the $R_o$ and $R_m$ groups are hydrogen, preferably all four $R_o$ and $R_m$ groups on at least two of the rings A, B and C are hydrogen; in some embodiments, all $R_o$ and $R_m$ groups on rings A, B and C are hydrogen; preferably each $R_p$ is independently selected from hydrogen, —$OR^1$ and —$NR^1R^2$; no more than two, preferably no more than one of $R_p$ is hydrogen, preferably none are hydrogen; more preferably at least one, preferably two, most preferably all three $R_p$ are —$NR^1R^2$; in some embodiments, one or even two of the Rings A, B and C may be replaced with an independently selected $C_3$-$C_9$ heteroaryl ring comprising one or two heteroatoms independently selected from O, S and N, optionally substituted with one or more independently selected $R^5$ groups; G is independently selected from the group consisting of hydrogen, deuterium, $C_1$-$C_{16}$ alkoxide, phenoxide, bisphenoxide, nitrite, nitrile, alkyl amine, imidazole, arylamine, polyalkylene oxide, halides, alkylsulfide, aryl sulfide, or phosphine oxide; in one aspect the fraction [(deuterium)/(deuterium+hydrogen)] for G is at least 0.20, preferably at least 0.40, even more preferably at least 0.50 and most preferably at least 0.60 or even at least 0.80;

wherein any two of $R^1$, $R^2$ and $R^3$ attached to the same heteroatom can combine to form a ring of five or more members optionally comprising one or more additional heteroatoms selected from the group consisting of —O—, —$NR^{15}$—, and —S—.

In the structures of Formula (II)-(III), wherein e and f are independently integers from 0 to 4; each $R^{20}$ and $R^{21}$ is independently selected from the group consisting of halogens, a nitro group, alkyl groups, substituted alkyl groups, —$NC(O)OR^1$, —$NC(O)SR^1$, —$OR^1$, and —$NR^1R^2$; each $R^{25}$ is independently selected from the group consisting of monosaccharide moiety, disaccharide moiety, oligosaccharide moiety, and polysaccharide moiety, —$C(O)R^1$, —$C(O)OR^1$, —$C(O)NR^1R^2$; and each $R^{22}$ and $R^{23}$ is independently selected from the group consisting of hydrogen, alkyl groups, and substituted alkyl groups.

In the structure of Formula (IV), $R^{30}$ is positioned ortho or para to the bridging amine moiety and is selected from the group consisting of —$OR^{38}$ and —$NR^{36}R^{37}$, each $R^{36}$ and $R^{37}$ is independently selected from the group consisting of hydrogen, alkyl groups, substituted alkyl groups, aryl groups, substituted aryl groups, acyl groups, $R^4$, —$C(O)OR^1$, —$C(O)R^1$, and —$C(O)NR^1R^2$; $R^{38}$ is selected from the group consisting of hydrogen, acyl groups, —$C(O)OR^1$, —$C(O)R^1$, and —$C(O)NR^1R^2$; g and h are independently integers from 0 to 4; each $R^{31}$ and $R^{32}$ is independently selected from the group consisting of alkyl groups, substituted alkyl groups, aryl groups, substituted aryl groups, alkaryl, substituted alkaryl, —$(CH_2)_n$—O—$R^1$, —$(CH_2)_n$—$NR^1R^2$, —$C(O)R^1$, —$C(O)OR^1$, —$C(O)O^-$, —$C(O)NR^1R^2$, —$OC(O)R^1$, —$OC(O)OR^1$, —$OC(O)NR^1R^2$, —$S(O)_2R^1$, —$S(O)_2OR^1$, —$S(O)_2O^-$, —$S(O)_2NR^1R^2$, —$NR^1C(O)R^2$, —$NR^1C(O)OR^2$, —$NR^1C(O)SR^2$, —$NR^1C(O)NR^2R^3$, —$P(O)_2R^1$, —$P(O)(OR^1)_2$, —$P(O)(OR^1)O^-$, and —$P(O)(O^-)_2$, wherein the index n is an integer from 0 to 4, preferably from 0 to 1, most preferably 0; —$NR^{34}R^{35}$ is positioned ortho or para to the bridging amine moiety and $R^{34}$ and $R^{35}$ are independently selected from the group consisting of hydrogen, alkyl, substituted alkyl, aryl, substituted aryl, alkaryl, substituted alkaryl, and $R^4$; $R^{33}$ is independently selected from the group consisting of hydrogen, —$S(O)_2R^1$, —$C(O)N(H)R^1$; —$C(O)OR^1$; and —$C(O)R^1$; when g is 2 to 4, any two adjacent $R^{31}$ groups may combine to form a fused ring of five or more members wherein no more than two of the atoms in the fused ring may be nitrogen atoms.

In the structure of Formula (V), $X^{40}$ is selected from the group consisting of an oxygen atom, a sulfur atom, and $NR^{45}$; $R^{45}$ is independently selected from the group consisting of hydrogen, deuterium, alkyl, substituted alkyl, aryl, substituted aryl, alkaryl, substituted alkaryl, —S(O)$_2$OH, —S(O)$_2$O$^-$, —C(O)OR$^1$, —C(O)R$^1$, and —C(O)NR$^1$R$^2$; $R^{40}$ and $R^{41}$ are independently selected from the group consisting of —(CH$_2$)$_n$—O—R$^1$, —(CH$_2$)$_n$—NR$^1$R$^2$, wherein the index n is an integer from 0 to 4, preferably from 0 to 1, most preferably 0; j and k are independently integers from 0 to 3; $R^{42}$ and $R^{43}$ are independently selected from the group consisting of alkyl, substituted alkyl, aryl, substituted aryl, alkaryl, substituted alkaryl, —S(O)$_2$R$^1$, —C(O)NR$^1$R$^2$, —NC(O)OR$^1$, —NC(O)SR$^1$, —C(O)OR$^1$, —C(O)R$^1$, —(CH$_2$)$_n$—O—R$^1$, —(CH$_2$)$_n$—NR$^1$R$^2$, wherein the index n is an integer from 0 to 4, preferably from 0 to 1, most preferably 0; $R^{44}$ is —C(O)R$^1$, —C(O)NR$^1$R$^2$, and —C(O)OR$^1$.

In the structures of Formula (I)-(V), wherein any charge present in any of the preceeding groups is balanced with a suitable independently selected internal or external counterion. Suitable independently selected external counterions may be cationic or anionic. Examples of suitable cations include but are not limited to one or more metals preferably selected from Group I and Group II, the most preferred of these being Na, K, Mg, and Ca, or an organic cation such as iminium, ammonium, and phosphonium. Examples of suitable anions include but are not limited to: fluoride, chloride, bromide, iodide, perchlorate, hydrogen sulfate, sulfate, aminosulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoroborate, acetate, chloroacetate, cyanoacetate, hydroxyacetate, aminoacetate, methylaminoacetate, di- and tri-chloroacetate, 2-chloro-propionate, 2-hydroxypropionate, glycolate, thioglycolate, thioacetate, phenoxyacetate, trimethylacetate, valerate, palmitate, acrylate, oxalate, malonate, crotonate, succinate, citrate, methylene-bis-thioglycolate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenyl-sulfonate and chlorotoluenesulfonate. Those of ordinary skill in the art are well aware of different counterions which can be used in place of those listed above.

In the structures of Formula (I)-(V), $R^1$, $R^2$, $R^3$, and $R^{15}$ are independently selected from the group consisting of hydrogen, alkyl, substituted alkyl, aryl, substituted aryl, alkaryl, substituted alkaryl, and $R^4$; wherein $R^4$ is an organic group composed of one or more organic monomers with said monomer molecular weights ranging from 28 to 500, preferably 43 to 350, even more preferably 43 to 250, wherein the organic group may be substituted with one or more additional leuco colorant moieties conforming to the structure of Formula I-V. In one aspect, $R^4$ is selected from the group consisting of alkyleneoxy (polyether), oxoalkyleneoxy (polyesters), oxoalkyleneamine (polyamides), epichlorohydrin, quaternized epichlorohydrin, alkyleneamine, hydroxyalkylene, acyloxyalkylene, carboxyalkylene, carboalkoxyalkylene, and sugar. Where any leuco colorant comprises an $R^4$ group with three or more contiguous monomers, that leuco colorant is defined herein as a "polymeric leuco colorant". One skilled in the art knows that the properties of a compound with regard to any of a number of characteristic attributes such as solubility, partitioning, deposition, removal, staining, etc., are related to the placement, identity and number of such contiguous monomers incorporated therein. The skilled artisan can therefore adjust the placement, identity and number of such contiguous monomers to alter any particular attribute in a more or less predictable fashion.

The leuco moiety can be covalently bound to the polyethylenimine through any suitable covalent linkage. In once aspect, the leuco moiety is covalently bound to an amine nitrogen in the polyethylenimine In other words, the leuco moiety can be covalently bound to the polyethylenimine by replacing an amine hydrogen on the polyethylenimine The leuco polymer can comprise any suitable number of leuco moieties. As noted above, the leuco polymer comprises at least one leuco moiety. In one aspect, the leuco polymer comprises a plurality of leuco moieties, each of which is independently selected from the groups described above. In one aspect, the leuco polymer comprises 1 to about 5 leuco moieties. In another aspect, the leuco polymer comprises 1 to about 2 leuco moieties. In one aspect, the leuco moiety can be attached to two or more polyethylenimines. Preferably, the leuco moiety is only attached to one polyethylenimine. In another aspect, the leuco moiety comprises about 1 wt. % to about 45 wt. % of the leuco polymer. (This weight percentage can be calculated by dividing the formula mass of the leuco moiety by the molar mass of the leuco polymer.)

The leuco polymer can also comprise a chromophore moiety covalently bound to the polyethylenimine In one aspect, such chromophore moiety can be the colored counterpart to a leuco moiety that is also bound to the polyethylenimine For example, the dye polymer can initially have two leuco moieties bound to the polyethylenimine, and one of the leuco moieties can convert to the corresponding colored chromophore moiety. In another aspect, such chromophore moiety can be different from the leuco moiety bound to the polyethylenimine (i.e., the chromophore moiety is not the colored counterpart to the leuco moiety bound to the polyethylenimine)

In one aspect, the leuco polymer can further comprise a red dye moiety covalently bound to the polyethylenimine If present, such red dye moiety can be present in any suitable amount. In one aspect, the ratio of red dye moieties to leuco moieties present in the leuco polymer is 1:100 to 1:4. The inclusion of the red dye moiety provides a red shade to the leuco polymer. In one aspect, the red dye moiety preferably is a mono-azo dye moiety.

In another aspect, the leuco polymer can be present in a leuco polymer composition. The leuco polymer composition comprises at least one leuco polymer as described above. In one aspect, the leuco polymer composition can also comprise another polyamine polymer. For example, the leuco polymer composition can comprise the virgin polyamine polymer used to produce the leuco polymer as described above. In another aspect, the leuco polymer composition can comprise a polyamine polymer that is similar in structure to the leuco polymer described above but which lacks a leuco moiety. In yet another aspect, the leuco polymer composition can comprise a colored polymer that is produced by conversion of a leuco moiety on a molecule of the leuco polymer to its corresponding colored chromophore moiety.

Preferably the weight average molecular weight of the leuco polymer is from 2000 to 200000, preferably from 7000 to 70000.

The leuco polymers described above are believed to be suitable for use in the treatment of textile materials, such as in domestic laundering processes. In particular, it is believed that the leuco polymer will deposit onto the fibers of the textile material due to the nature of the leuco polymer. Further, once deposited onto the textile material, the leuco polymer can be converted to a colored polymer through the application of the appropriate chemical or physical triggers that will convert the leuco moiety on the polymer to its colored form. For example, the leuco polymer can be converted to its colored form upon oxidation of the leuco moiety to the oxidized colorant. By selecting the proper leuco moiety, the leuco polymer can be designed to impart a desired hue to the textile material as the leuco polymer is converted to its colored form. For example, a leuco polymer that exhibits a blue hue upon conversion to its colored form can be used to counteract the yellowing of the textile material to normally occurs due to the passage of time and/or repeated launderings. Thus, in other embodiments, the invention provides laundry care compositions comprising the above-described leuco polymer and domestic methods for treating a textile material (e.g., methods for washing an article of laundry or clothing).

Preferably the leuco polymer gives a hue to the cloth with a relative hue angle of 210 to 345, or even a relative hue angle of 240 to 320, or even a relative hue angle of 250 to 300 (e.g., 250 to 290). The relative hue angle can be determined by any suitable method as known in the art. However, preferably it may be determined as described in further detail herein with respect to deposition of the leuco entity on cotton relative to cotton absent any leuco entity.

In addition to providing whitening or blueing benefits as discussed above, the leuco-polymers of the current invention may also serve to prevent re-deposition of soil in the wash and aid removal of soil.

The leuco polymer described above can be made by any suitable process. In one aspect, the leuco polymer can be made by reacting a polyamine with a reactive leuco compound to produce leuco polymer. The polyamine used in the processes described above can be any suitable polyamine polymer, such as the polyamine and polyethyleneimine polymers described above.

The reactive leuco compound can comprise any suitable leuco moiety as defined above. In one aspect, the leuco moiety is a univalent or polyvalent moiety derived by removal of one or more hydrogen atoms from a structure of Formula (I), (II), (III), (IV), or (V) as described above.

As noted above, the reactive leuco compound(s) present in the leuco composition comprise at least one reactive moiety covalently bound to the leuco moiety. The reactive moiety can be any suitable electrophilic moiety. Suitable electrophilic moieties are those that are sufficiently electrophilic to react with an organic nucleophilic moiety having a resonance structure (contributing structure) in which a lone pair of electrons or a negative charge resides on a carbon, nitrogen, oxygen, sulfur, or phosphorus atom within the moiety. Upon reacting, the reactive moiety creates a covalent bond between the leuco moiety and the compound containing the organic nucleophilic moiety. Preferably, the reactive moiety is sufficiently electrophilic to react with a nucleophilic moiety selected from the group consisting of a hydroxy group, a sulfhydryl group, a cyano group, alkoxy groups, amine groups (primary, secondary, or tertiary amines), carbanions, carboxyl groups, thiocarboxylate groups, thiolate groups, and thiocyanate groups. In another preferred embodiment, the reactive moiety is sufficiently electrophilic to react with a nucleophilic moiety selected from the group consisting of a hydroxy group, a sulfhydryl group, and amine groups. Suitable reactive moieties include, but are not limited to, those moieties which react with an amine to form a carbamate, a urea, an amide, a sulfonamide, or a higher order amine (such as secondary amine from a primary amine, a tertiary amine from a secondary amine, and a quaternary amine from a primary, secondary or tertiary amine via alkylation). Suitable reactive moieties also include, but are not limited to, those moieties which react with an alcohol to form carbonates, carbamates, carboxylic acid esters, sulfonic acid esters, or ethers. Suitable reactive moieties also include, but are not limited to, those moieties which react with a sulfhydryl (thiol) to form thiocarbonates, thiocarbamates, and the like. Suitable reactive moieties include, but are not limited to, those illustrated below:

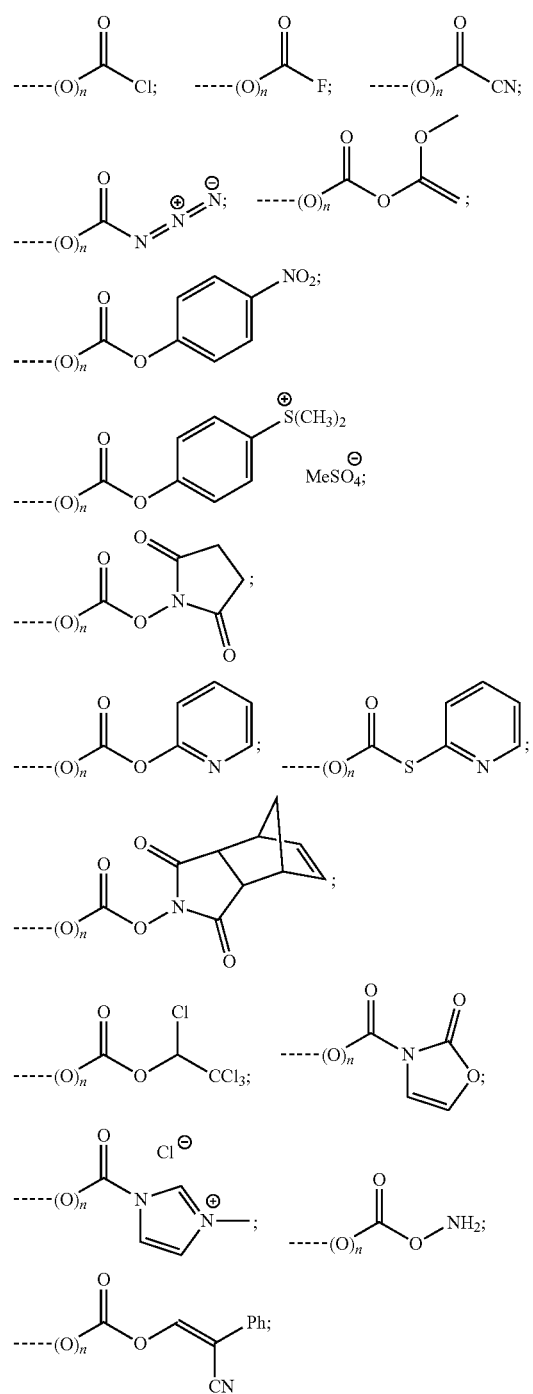

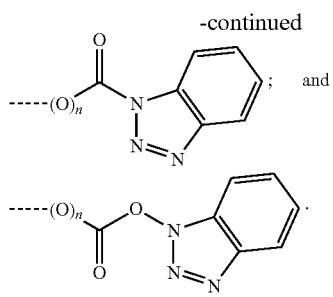

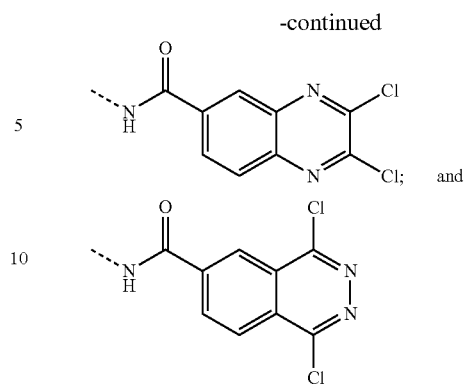

In the structures above, the index n is 0 or 1. When n is 1, reaction of the above groups with an amine forms a carbamate, and reaction with an alcohol forms a carbonate. When n is 0, the product of reaction with an amine is a carboxylic acid amide, and the product of reaction with an alcohol is a carboxylic acid ester. Similar groups suitable for the formation of sulfonic acid esters and amides are well known to those skilled in the art. In like manner, alkyl halides and alkyl tosylates are representative of reactive groups that may react with an amine to form a higher order amine, or with an alcohol to form an ether.

In addition to the more traditional groups that may be used as reactive moieties, any of the many specialized electrophilic moieties that have been employed as anchoring groups for reactive dyes may be profitably employed. Reactive dyes consist of a dye chromophore covalently bound to a reactive moiety. These reactive moieties react with nucleophilic moieties (e.g., primary and secondary amines) to form a covalent bound, preferably by a substitution or addition reaction.

Reactive moieties of this sort are preferably selected from heterocyclic reactive moieties and a sulfooxyethylsulfonyl reactive group (—SO$_2$CH$_2$CH$_2$OSO$_3$Na). The heterocyclic reactive moieties are preferably nitrogen-containing aromatic rings bound to a halogen or an ammonium, which react with nucleophilic moieties (e.g., primary amines and second amines) of another compound to form a covalent bond. These heterocyclic reactive moieties preferably contain a halogen, such as chlorine or fluorine. In a preferred embodiment, the reactive moiety preferably is selected from the group consisting of sulfooxyethylsulfonyl moieties, vinylsulfonyl moieties, halotriazinyl moieties, quaternary ammoniumtriazinyl moieties, halopyrimidinyl moieties, halopyridazinyl moieties, haloquinoxalinyl moieties, halophthalazinyl moieties, bromoacrlyamidyl moieties, and benzothiazolyl moieties. More preferred heterocylic reactive moieties are dichlorotriazinyl, difluorochloropyrimi-dine, monofluorotrazinyl, monofluorochlorotrazinyl, dichloroquinoxaline, difluorotriazine, monochlorotriazinyl, and trichloropyrimidine.

Especially preferred heterocylic reactive moieties are:

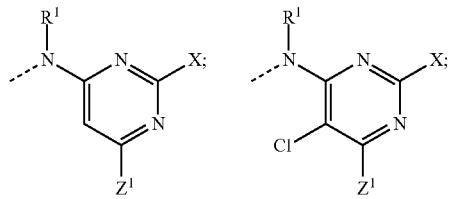

wherein R$^1$ is selected from H or alkyl, preferably H; X is selected from F or Cl; when X=Cl, Z$^1$ is selected from —Cl, —NR$^2$R$^3$, —OR$^2$, —SO$_3$Na; when X=F, Z$^1$ is selected from —NR$^2$R$^3$ wherein R$^2$ and R$^3$ are independently selected from H, alkyl and aryl groups. Aryl groups are preferably phenyl and are preferably substituted by —SO$_3$Na or —SO$_2$CH$_2$CH$_2$OSO$_3$Na. Alkyl groups are preferably methyl or ethyl. The phenyl groups may be further substituted with suitable uncharged organic groups, preferably with a molecular weight lower than 200. Preferred groups include —CH$_3$, —C$_2$H$_5$, and —OCH$_3$. The alkyl groups may be further substituted with suitable uncharged organic groups, preferably with a molecular weight lower than 200. Preferred groups include —CH$_3$, —C$_2$H$_5$, —OH, —OCH$_3$, —OC$_2$H$_4$OH. Most preferred heterocylic reactive moieties are selected from:

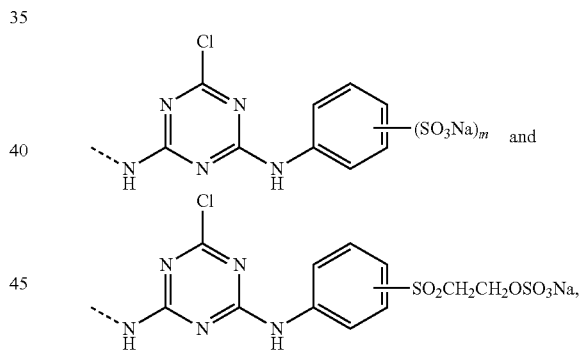

wherein m=1 or 2, preferably 1.

In another aspect, the reactive moiety is selected from the group consisting of:

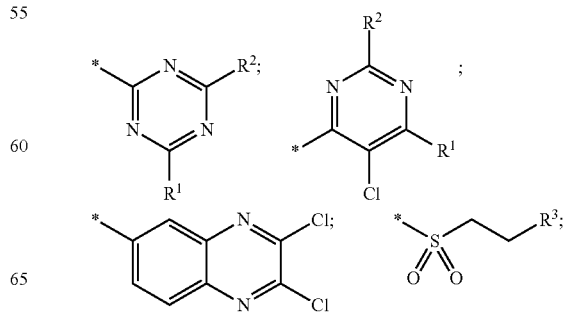

-continued

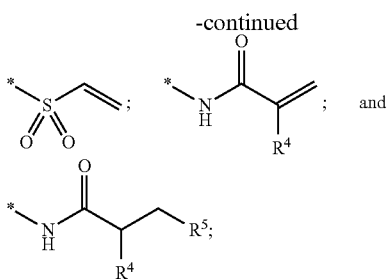

wherein $R^3$ is —$OSO_3X$, —$OSO_3^-$, or —Cl. $R^4$ and $R^5$ are independently selected from —Cl and —Br; $R^1$ and $R_2$ are independently selected from —Cl, —F, and the radical selected from:

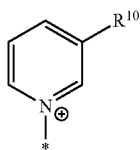

where $R^{10}$ is selected from H, —$CO_2X$ where X is hydrogen or a cation of an alkali or alkaline earth metal or an ammonium.

In one aspect, the reactive leuco compound comprises more than one reactive moiety, preferably two or three. In such embodiments, the reactive moieties can be the same or different.

In a third embodiment, the invention provides a laundry care composition comprising (a) laundry care active, and (b) a leuco polymer as described above.

The leuco polymer present in the laundry care composition can be any of the leuco polymers described above in connection with the earlier embodiments of the invention. The leuco polymer can be present in the laundry care composition in any suitable amount. In one aspect, the laundry care composition comprises from about 0.001 wt. % to about 2.0 wt. %, preferably about 0.05 wt. % to about 0.2 wt. %, of the leuco polymer. In such an embodiment, the laundry care composition can comprise from about 2 wt. % to about 70 wt. % of surfactant (either a single surfactant or, more preferably, a combination of surfactants selected from those discussed below).

Laundry Care Ingredients
Surfactant System

The products of the present invention may comprise from about 0.00 wt %, more typically from about 0.10 to 80% by weight of a surfactant. In one aspect, such compositions may comprise from about 5% to 50% by weight of surfactant. Surfactants utilized can be of the anionic, nonionic, amphoteric, ampholytic, zwitterionic, or cationic type or can comprise compatible mixtures of these types. Anionic and nonionic surfactants are typically employed if the fabric care product is a laundry detergent. On the other hand, cationic surfactants are typically employed if the fabric care product is a fabric softener.

Anionic Surfactant

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, or even from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Preferred alkyl sulphates are C8-18 alkyl alkoxylated sulphates, preferably a C12-15 alkyl or hydroxyalkyl alkoxylated sulphates. Preferably the alkoxylating group is an ethoxylating group. Typically the alkyl alkoxylated sulphate has an average degree of alkoxylation from 0.5 to 30 or 20, or from 0.5 to 10. The alkyl group may be branched or linear. The alkoxylated alkyl sulfate surfactant may be a mixture of alkoxylated alkyl sulfates, the mixture having an average (arithmetic mean) carbon chain length within the range of about 12 to about 30 carbon atoms, or an average carbon chain length of about 12 to about 15 carbon atoms, and an average (arithmetic mean) degree of alkoxylation of from about 1 mol to about 4 mols of ethylene oxide, propylene oxide, or mixtures thereof, or an average (arithmetic mean) degree of alkoxylation of about 1.8 mols of ethylene oxide, propylene oxide, or mixtures thereof. The alkoxylated alkyl sulfate surfactant may have a carbon chain length from about 10 carbon atoms to about 18 carbon atoms, and a degree of alkoxylation of from about 0.1 to about 6 mols of ethylene oxide, propylene oxide, or mixtures thereof. The alkoxylated alkyl sulfate may be alkoxylated with ethylene oxide, propylene oxide, or mixtures thereof. Alkyl ether sulfate surfactants may contain a peaked ethoxylate distribution. Specific example include C12-C15 EO 2.5 Sulfate, C14-C15 EO 2.5 Sulfate and C12-C15 EO 1.5 Sulfate derived from NEODOL® alcohols from Shell and C12-C14 EO3 Sulfate, C12-C16 EO3 Sulfate, C12-C14 EO2 Sulfate and C12-C14 EO1 Sulfate derived from natural alcohols from Huntsman. The AES may be linear, branched, or combinations thereof. The alkyl group may be derived from synthetic or natural alcohols such as those supplied by the tradename Neodol® by Shell, Safol®, Lial®, and Isalchem® by Sasol or midcut alcohols derived from vegetable oils such as coconut and palm kernel. Another suitable anionic detersive surfactant is alkyl ether carboxylate, comprising a C10-C26 linear or branched, preferably C10-C20 linear, most preferably C16-C18 linear alkyl alcohol and from 2 to 20, preferably 7 to 13, more preferably 8 to 12, most preferably 9.5 to 10.5 ethoxylates. The acid form or salt form, such as sodium or ammonium salt, may be used, and the alkyl chain may contain one cis or trans double bond. Alkyl ether carboxylic acids are available from Kao (Akypo®), Huntsman (Empicol®) and Clariant (Emulsogen®).

Other useful anionic surfactants can include the alkali metal salts of alkyl benzene sulfonates, in which the alkyl group contains from about 9 to about 15 carbon atoms, in straight chain (linear) or branched chain configuration. In some examples, the alkyl group is linear. Such linear alkylbenzene sulfonates are known as "LAS." In other examples, the linear alkylbenzene sulfonate may have an average number of carbon atoms in the alkyl group of from about 11 to 14. In a specific example, the linear straight chain alkylbenzene sulfonates may have an average number of carbon atoms in the alkyl group of about 11.8 carbon atoms, which may be abbreviated as C11.8 LAS. Preferred sulphonates are C10-13 alkyl benzene sulphonate. Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used. Suitable anionic sulfonate surfactants for use herein include water-soluble salts of C8-C18 alkyl or hydroxyalkyl sulfonates; C11-C18 alkyl benzene sulfonates (LAS), modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; methyl ester sulfonate (MES); and alpha-olefin sulfonate (AOS). Those also include the paraffin sulfonates may be monosulfonates and/or disulfonates, obtained by sulfonating paraffins of 10 to 20 carbon atoms. The sulfonate surfactant may also include the alkyl glyceryl sulfonate surfactants. Anionic surfactants of the present invention may exist in an acid form, and said acid form may be neutralized to form a surfactant salt which is desirable for use in the present detergent compositions. Typical agents for neutralization include the metal counterion base such as hydroxides, e.g., NaOH or KOH. Further preferred agents for neutralizing anionic surfactants of the present invention and adjunct anionic surfactants or cosurfactants in their acid forms include ammonia, amines, or alkanolamines. Alkanolamines are preferred. Suitable non-limiting examples including monoethanolamine, diethanolamine, triethanolamine, and other linear or branched alkanolamines known in the art; for example, highly preferred alkanolamines include 2-amino-1-propanol, 1-aminopropanol, monoisopropanolamine, or 1-amino-3-propanol.

Nonionic Surfactant

Preferably the composition comprises a nonionic detersive surfactant. Suitable nonionic surfactants include alkoxylated fatty alcohols. The nonionic surfactant may be selected from ethoxylated alcohols and ethoxylated alkyl phenols of the formula R(OC2H4),OH, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. Other non-limiting examples of nonionic surfactants useful herein include: C8-C18 alkyl ethoxylates, such as, NEODOL® nonionic surfactants from Shell; C6-C12 alkyl phenol alkoxylates where the alkoxylate units may be ethyleneoxy units, propyleneoxy units, or a mixture thereof; C12-C18 alcohol and C6-C12 alkyl phenol condensates with ethylene oxide/propylene oxide block polymers such as Pluronic® from BASF; C14-C22 mid-chain branched alcohols, BA; C14-C22 mid-chain branched alkyl alkoxylates, BAE$_x$, wherein x is from 1 to 30; alkylpolysaccharides; specifically alkylpolyglycosides; polyhydroxy fatty acid amides; and ether capped poly(oxyalkylated) alcohol surfactants. Specific example include C12-C15 EO7 and C14-C15 EO7 NEODOL® nonionic surfactants from Shell, C12-C14 EO7 and C12-C14 EO9 Surfonic® nonionic surfactants from Huntsman.

Highly preferred nonionic surfactants are the condensation products of Guerbet alcohols with from 2 to 18 moles, preferably 2 to 15, more preferably 5-9 of ethylene oxide per mole of alcohol. Suitable nonionic surfactants include those with the trade name Lutensol® from BASF. Lutensol XP-50 is a Guerbet ethoxylate that contains an average of about 5 ethoxy groups. Lutensol XP-80 and containing an average of about 8 ethoxy groups. Other suitable non-ionic surfactants for use herein include fatty alcohol polyglycol ethers, alkylpolyglucosides and fatty acid glucamides, alkylpolyglucosides based on Guerbet alcohols.

Amphoteric Surfactant

The surfactant system may include amphoteric surfactant, such as amine oxide. Preferred amine oxides are alkyl dimethyl amine oxide or alkyl amido propyl dimethyl amine oxide, more preferably alkyl dimethyl amine oxide and especially coco dimethyl amino oxide Amine oxide may have a linear or mid-branched alkyl moiety.

Ampholytic Surfactants

The surfactant system may comprise an ampholytic surfactant. Specific, non-limiting examples of ampholytic surfactants include: aliphatic derivatives of secondary or tertiary amines, or aliphatic derivatives of heterocyclic secondary and tertiary amines in which the aliphatic radical can be straight- or branched-chain. One of the aliphatic substituents may contain at least about 8 carbon atoms, for example from about 8 to about 18 carbon atoms, and at least one contains an anionic water-solubilizing group, e.g. carboxy, sulfonate, sulfate. See U.S. Pat. No. 3,929,678 at column 19, lines 18-35, for suitable examples of ampholytic surfactants.

Zwitterionic Surfactant

Zwitterionic surfactants are known in the art, and generally include surfactants which are neutrally charged overall, but carry at least one positive charged atom/group and at least one negatively charged atom/group. Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 at column 19, line 38 through column 22, line 48, for examples of zwitterionic surfactants; betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylammino-1-propane sulfonate where the alkyl group can be $C_8$ to $C_{18}$ and in certain embodiments from $C_{10}$ to $C_{14}$. A preferred zwitterionic surfactant for use in the present invention is the cocoamidopropyl betaine.

Cationic Surfactants

Examples of cationic surfactants include quaternary ammonium surfactants, which can have up to 26 carbon atoms specific. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006, which is herein incorporated by reference; d) cationic ester surfactants as discussed in U.S. Pat. Nos. 4,228,042, 4,239,660 4,260,529 and U.S. Pat. No. 6,022, 844, which is herein incorporated by reference; and e) amino surfactants as discussed in U.S. Pat. No. 6,221,825 and WO 00/47708, which is herein incorporated by reference, and specifically amido propyldimethyl amine (APA). Useful cationic surfactants also include those described in U.S. Pat. No. 4,222,905, Cockrell, issued Sep. 16, 1980, and in U.S. Pat. No. 4,239,659, Murphy, issued Dec. 16, 1980, both of which are also incorporated herein by reference. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Adjunct Cleaning Additives

The cleaning compositions of the invention may also contain adjunct cleaning additives. The precise nature of the cleaning adjunct additives and levels of incorporation thereof will depend on the physical form of the cleaning composition, and the precise nature of the cleaning operation for which it is to be used.

The adjunct cleaning additives may be selected from the group consisting of builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds supressors, softeners, and perfumes. This listing of adjunct cleaning additives is exemplary only, and not by way of limitation of the types of adjunct cleaning additives which can be used. In principle, any adjunct cleaning additive known in the art may be used in the instant invention.

Polymers

The composition may comprise one or more polymers. Non-limiting examples, all of which may be optionally modified, include polyethyleneimines, carboxymethylcellulose, poly(vinyl-pyrrolidone), poly (ethylene glycol), poly (vinyl alcohol), poly(vinylpyridine-N-oxide), poly(vinylimidazole), polycarboxylates or alkoxylated substituted phenols (ASP). as described in WO 2016/041676. An example of ASP dispersants, include but are not limited to, HOSTAPAL BV CONC S1000 available from Clariant.

Polyamines may be used for grease, particulate removal or stain removal. A wide variety of amines and polyaklyeneimines can be alkoxylated to various degrees to achieve hydrophobic or hydrophilic cleaning. Such compounds may include, but are not limited to, ethoxylated polyethyleneimine, ethoxylated hexamethylene diamine, and sulfated versions thereof. Useful examples of such polymers are HP20 available from BASF or a polymer having the following general structure:

$bis((C_2H_5O)\ (C_2H_4O)_n)(CH_3)$—N+—$C_xH_{2x}$—N+—$(CH_3)$-bis$((C_2H_5O)(C_2H_4O)_n)$, wherein n=from 20 to 30, and x=from 3 to 8, or sulphated or sulphonated variants thereof. Polypropoxylated-polyethoxylated amphiphilic polyethyleneimine derivatives may also be included to achieve greater grease removal and emulsification. These may comprise alkoxylated polyalkylenimines, preferably having an inner polyethylene oxide block and an outer polypropylene oxide block. Detergent compositions may also contain unmodified polyethyleneimines useful for enhanced beverage stain removal. PEI's of various molecular weights are commercially available from the BASF Corporation under the trade name Lupasol® Examples of suitable PEI's include, but are not limited to, Lupasol FG®, Lupasol G-35®.

The composition may comprise one or more carboxylate polymers, such as a maleate/acrylate random copolymer or polyacrylate homopolymer useful as polymeric dispersing agents. Alkoxylated polycarboxylates such as those prepared from polyacrylates are also useful to provide clay dispersancy. Such materials are described in WO 91/08281. Chemically, these materials comprise polyacrylates having one ethoxy side-chain per every 7-8 acrylate units. The side-chains are of the formula —$(CH_2CH_2O)_m\ (CH_2)_nCH_3$ wherein m is 2-3 and n is 6-12. The side-chains are ester or ether-linked to the polyacrylate "backbone" to provide a "comb" polymer type structure.

Preferred amphiphilic graft co-polymer(s) comprise (i) polyethyelene glycol backbone; and (ii) at least one pendant moiety selected from polyvinyl acetate, polyvinyl alcohol and mixtures thereof. An example of an amphiphilic graft co-polymer is Sokalan HP22, supplied from BASF.

Alkoxylated substituted phenols as described in WO 2016/041676 are also suitable examples of polymers that provide clay dispersancy. Hostapal BV Conc S1000, available from Clariant, is one non-limiting example of an ASP dispersant,.

Preferably the composition comprises one or more soil release polymers. Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN260 SRN300 and SRN325 supplied by Clariant. Other suitable soil release polymers are Marloquest polymers, such as Marloquest SL, HSCB, L235M, B, G82 supplied by Sasol. Other suitable soil release polymers include methyl-capped ethoxylated propoxylated soil release polymers as described in U.S. Pat. No. 9,365,806.

Preferably the composition comprises one or more polysaccharides which may in particular be chosen from carboxymethyl cellulose, methylcarboxymethylcellulose, sulfoethylcellulose, methylhydroxyethylcellulose, carboxymethyl xyloglucan, carboxymethyl xylan, sulfoethylgalactomannan, carboxymethyl galactomannan, hydoxyethyl galactomannan, sulfoethyl starch, carboxymethyl starch, and mixture thereof. Other polysaccharides suitable for use in the present invention are the glucans. Preferred glucans are Poly alpha-1,3-glucan which is a polymer comprising glucose monomeric units linked together by glycosidic linkages (i.e., glucosidic linkages), wherein at least about 50% of the glycosidic linkages are alpha-1,3-glycosidic linkages. Poly alpha-1,3-glucan is a type of polysaccharide. Poly alpha-1,3-glucan can be enzymatically produced from sucrose using one or more glucosyltransferase enzymes, such as described in U.S. Pat. No. 7,000,000, and U.S. Patent Appl. Publ. Nos. 2013/0244288 and 2013/0244287 (all of which are incorporated herein by reference), for example.

Other suitable polysaccharides for use in the composition are cationic polysaccharides. Examples of cationic polysaccharides include cationic guar gum derivatives, quaternary nitrogen-containing cellulose ethers, and synthetic polymers that are copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Suitable cationic polymers are described in U.S. Pat. Nos. 3,962,418; 3,958,581; and U.S. Publication No. 2007/0207109A1.

Polymers can also function as deposition aids for other detergent raw materials. Preferred deposition aids are selected from the group consisting of cationic and nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or more monomers selected from the group comprising acrylic acid and acrylamide.

Additional Amines

Polyamines are known to improve grease removal. Preferred cyclic and linear amines for performance are 1,3-bis (methylamine)-cyclohexane, 4-methylcyclohexane-1,3-diamine (Baxxodur ECX 210 supplied by BASF) 1,3 propane diamine, 1,6 hexane diamine,1,3 pentane diamine (Dytek EP supplied by Invista), 2-methyl 1,5 pentane diamine (Dytek A supplied by Invista). U.S. Pat. No. 6,710,023 discloses hand dishwashing compositions containing said diamines and polyamines containing at least 3 protonable amines Polyamines according to the invention have at least one pka above the wash pH and at least two pka's greater than about 6 and below the wash pH. Preferred polyamines with are selected from the group consisting of tetraethylenepentamine, hexaethylhexamine, heptaethylheptamines, octaethyloctamines, nonethylnonamines, and mixtures thereof commercially available from Dow, BASF and Huntman. Especially preferred polyetheramines are lipophilic modified as described in U.S. Pat. Nos. 9,752,101, 9,487,739, 9,631,163

Dye Transfer Inhibitor (DTI)

The composition may comprise one or more dye transfer inhibiting agents. In one embodiment of the invention the inventors have surprisingly found that compositions comprising polymeric dye transfer inhibiting agents in addition to the specified dye give improved performance. This is surprising because these polymers prevent dye deposition. Suitable dye transfer inhibitors include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Suitable examples include PVP-K15, PVP-K30, ChromaBond S-400, ChromaBond S-403E and Chromabond S-100 from Ashland Aqualon, and Sokalan HP165, Sokalan HP50, Sokalan HP53, Sokalan HP59, Sokalan® HP 56K, Sokalan® HP 66 from BASF. Other suitable DTIs are as described in WO2012/004134. When present in a subject composition, the dye transfer inhibiting agents may be present at levels from about 0.0001% to about 10%, from about 0.01% to about 5% or even from about 0.1% to about 3% by weight of the composition.

Enzymes

Enzymes may be included in the cleaning compositions for a variety of purposes, including removal of protein-based, carbohydrate-based, or triglyceride-based stains from substrates, for the prevention of refugee dye transfer in fabric laundering, and for fabric restoration. Suitable enzymes include proteases, amylases, lipases, carbohydrases, cellulases, oxidases, peroxidases, mannanases, and mixtures thereof of any suitable origin, such as vegetable, animal, bacterial, fungal, and yeast origin. Other enzymes that may be used in the cleaning compositions described herein include hemicellulases, peroxidases, proteases, cellulases, endoglucanases, xylanases, lipases, phospholipases, amylases, gluco-amylases, xylanases, esterases, cutinases, pectinases, keratanases, reductases, oxidases, phenoloxidases, lipoxygenases, ligninases, pullulanases, tannases, pentosanases, malanases, O-glucanases, arabinosidases, hyaluronidases, chondroitinases, laccases, or mixtures thereof., esterases, mannanases, pectate lyases, and or mixtures thereof. Other suitable enzymes include Nuclease enzyme. The composition may comprise a nuclease enzyme. The nuclease enzyme is an enzyme capable of cleaving the phosphodiester bonds between the nucleotide sub-units of nucleic acids. The nuclease enzyme herein is preferably a deoxyribonuclease or ribonuclease enzyme or a functional fragment thereof. Enzyme selection is influenced by factors such as pH-activity and/or stability optima, thermostability, and stability to active detergents, builders, and the like.

The enzymes may be incorporated into the cleaning composition at levels from 0.0001% to 5% of active enzyme by weight of the cleaning composition. The enzymes can be added as a separate single ingredient or as mixtures of two or more enzymes.

In some embodiments, lipase may be used. Lipase may be purchased under the trade name Lipex from Novozymes (Denmark). Amylases (Natalase®, Stainzyme®, Stainzyme Plus®) may be supplied by Novozymes, Bagsvaerd, Denmark. Proteases may be supplied by Genencor International, Palo Alto, Calif., USA (e.g. Purafect Prime®) or by Novozymes, Bagsvaerd, Denmark (e.g. Liquanase®, Coronase®, Savinase®). Other preferred enzymes include pectate lyases preferably those sold under the trade names Pectawash®, Xpect®, Pectaway® and the mannanases sold under the trade names Mannaway® (all from Novozymes A/S, Bagsvaerd, Denmark), and Purabrite® (Genencor International Inc., Palo Alto, Calif.). A range of enzyme materials and means for their incorporation into synthetic cleaning compositions is disclosed in WO 9307263 A; WO 9307260 A; WO 8908694 A; U.S. Pat. Nos. 3,553,139; 4,101,457; and 4,507,219. Enzyme materials useful for liquid cleaning compositions, and their incorporation into such compositions, are disclosed in U.S. Pat. No. 4,261,868.

Enzyme Stabilizing System

The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, chlorine bleach scavengers and mixtures thereof, and are designed to address different stabilization problems depending on the type and physical form of the cleaning composition. See U.S. Pat. No. 4,537,706 for a review of borate stabilizers.

Chelating Agent.

Preferably the composition comprises chelating agents and/or crystal growth inhibitor. Suitable molecules include copper, iron and/or manganese chelating agents and mixtures thereof. Suitable molecules include aminocarboxylates, aminophosphonates, succinates, salts thereof, and mixtures thereof. Non-limiting examples of suitable chelants for use herein include ethylenediaminetetracetates, N-(hydroxyethyl)-ethylene-diamine-triacetates, nitrilotriacetates, ethylenediamine tetraproprionates, triethylene-tetraaminehexacetates, diethylenetriamine-pentaacetates, ethanoldiglycines, ethylenediaminetetrakis (methylenephosphonates), diethylenetriamine penta(methylene phosphonic acid) (DTPMP), ethylenediamine disuccinate (EDDS), hydroxyethanedimethylenephosphonic acid (HEDP), methylglycinediacetic acid (MGDA), diethylenetriaminepentaacetic acid (DTPA), and 1,2-diydroxybenzene-3,5-disulfonic acid (Tiron), salts thereof, and mixtures thereof. Tiron as well as other sulphonated catechols may also be used as effective heavy metal chelants. Other non-limiting examples of chelants of use in the present invention are found in U.S. Pat. Nos. 7,445,644, 7,585,376 and 2009/0176684A1. Other suitable chelating agents for use herein are the commercial DEQUEST series, and chelants from Monsanto, DuPont, and Nalco Inc.

Brighteners

Optical brighteners or other brightening or whitening agents may be incorporated at levels of from about 0.01% to about 1.2%, by weight of the composition, into the cleaning compositions described herein. Commercial optical brighteners, which may be used herein, can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. Examples of such brighteners are disclosed in "The Production and Application of Fluorescent Brightening Agents," M. Zahradnik, John Wiley & Sons, New York (1982). Specific, non-limiting examples of optical brighteners which may be useful in the present compositions are those identified in U.S. Pat. Nos. 4,790,856 and 3,646,015. Highly preferred Brighteners include Disodium 4,4'-bis{[4-anilino-6-[bis(2-hydroxyethyl)amino-s-triazin-2-yl]-amino}-2,2'-stilbenedisulfonate, 4,4'-bis{[4-anilino-6-morpholino-s-triazin-2-yl]-amino}-2,2'-stilbenedisulfonate, Disodium 4,4"-bis[(4,6-di-anilino-s-triazin-2-yl)-aminol-2,2'-stilbenedisulfonate and disodium 4,4'-bis-(2-sulfostyryl) biphenyl.

Bleaching Agents.

It may be preferred for the composition to comprise one or more bleaching agents. Suitable bleaching agents include photobleaches, hydrogen peroxide, sources of hydrogen peroxide, pre-formed peracids and mixtures thereof.

(1) photobleaches for example sulfonated zinc phthalocyanine sulfonated aluminium phthalocyanines, xanthene dyes and mixtures thereof;

(2) pre-formed peracids: Suitable preformed peracids include, but are not limited to compounds selected from the group consisting of pre-formed peroxyacids or salts thereof typically a percarboxylic acids and salts, percarbonic acids and salts, perimidic acids and salts, peroxymonosulfuric acids and salts, for example, Oxone®, and mixtures thereof. Suitable examples include peroxycarboxylic acids or salts thereof, or peroxysulphonic acids or salts thereof. Particularly preferred peroxyacids are phthalimido-peroxy-alkanoic acids, in particular ε-phthalimido peroxy hexanoic acid (PAP). Preferably, the peroxyacid or salt thereof has a melting point in the range of from 30 oC to 60 oC.

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof.

Fabric Shading Dyes

The fabric shading dye (sometimes referred to as hueing, bluing or whitening agents) typically provides a blue or violet shade to fabric. Such dye(s) are well known in the art and may be used either alone or in combination to create a specific shade of hueing and/or to shade different fabric types. The fabric shading dye may be selected from any chemical class of dye as known in the art, including but not limited to acridine, anthraquinone (including polycyclic quinones), azine, azo (e.g., monoazo, disazo, trisazo, tetrakisazo, polyazo), benzodifurane, benzodifuranone, carotenoid, coumarin, cyanine, diazahemicyanine, diphenylmethane, formazan, hemicyanine, indigoids, methane, naphthalimides, naphthoquinone, nitro, nitroso, oxazine, phthalocyanine, pyrazoles, stilbene, styryl, triarylmethane, triphenylmethane, xanthenes and mixtures thereof. The amount of adjunct fabric shading dye present in a laundry care composition of the invention is typically from 0.0001 to 0.05 wt % based on the total cleaning composition, preferably from 0.0001 to 0.005 wt %. Based on the wash liquor, the concentration of fabric shading dye typically is from 1 ppb to 5 ppm, preferably from 10 ppb to 500 ppb.

Suitable fabric shading dyes include small molecule dyes, polymeric dyes and dye-clay conjugates. Preferred fabric shading dyes are selected from small molecule dyes and polymeric dyes. Suitable small molecule dyes may be selected from the group consisting of dyes falling into the Colour Index (C.I., Society of Dyers and Colourists, Bradford, UK) classifications of Acid, Direct, Basic, Reactive, Solvent or Disperse dyes.

Suitable polymeric dyes include dyes selected from the group consisting of polymers containing covalently bound (sometimes referred to as conjugated) chromogens, (also known as dye-polymer conjugates), for example polymers with chromogen monomers co-polymerized into the backbone of the polymer and mixtures thereof. Preferred polymeric dyes comprise the optionally substituted alkoxylated dyes, such as alkoxylated triphenyl-methane polymeric colourants, alkoxylated carbocyclic and alkoxylated heterocyclic azo colourants including alkoxylated thiophene polymeric colourants, and mixtures thereof, such as the fabric-substantive colorants sold under the name of Liquitint® (Milliken, Spartanburg, S.C., USA).

Suitable dye clay conjugates include dye clay conjugates selected from the group comprising at least one cationic/basic dye and a smectite clay; a preferred clay may be selected from the group consisting of Montmorillonite clay, Hectorite clay, Saponite clay and mixtures thereof.

Pigments are well known in the art and may also be used in the laundry care compositions herein. Suitable pigments include C.I Pigment Blues 15 to 20, especially 15 and/or 16, C.I. Pigment Blue 29, C.I. Pigment Violet 15, Monastral Blue and mixtures thereof.

Builders

The cleaning compositions of the present invention may optionally comprise a builder. Builders selected from aluminosilicates and silicates assist in controlling mineral hardness in wash water, or to assist in the removal of particulate soils from surfaces. Suitable builders may be selected from the group consisting of phosphates polyphosphates, especially sodium salts thereof; carbonates, bicarbonates, sesquicarbonates, and carbonate minerals other than sodium carbonate or sesquicarbonate; organic mono-, di-, tri-, and tetracarboxylates, especially water-soluble non-surfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing cleaning compositions.

pH Buffer System

The compositions may also include a pH buffer system. The cleaning compositions herein may be formulated such that, during use in aqueous cleaning operations, the wash water will have a pH of between about 6.0 and about 12, and in some examples, between about 7.0 and 11. Techniques for controlling pH at recommended usage levels include the use of buffers, alkalis, or acids, and are well known to those skilled in the art. These include, but are not limited to, the use of sodium carbonate, citric acid or sodium citrate, monoethanol amine or other amines, boric acid or borates, and other pH-adjusting compounds well known in the art. The cleaning compositions herein may comprise dynamic in-wash pH profiles by delaying the release of citric acid.

Structurant/Thickeners

Structured liquids can either be internally structured, whereby the structure is formed by primary ingredients (e.g. surfactant material) and/or externally structured by providing a three dimensional matrix structure using secondary ingredients (e.g. polymers, clay and/or silicate material). The composition may comprise from about 0.01% to about 5%, by weight of the composition, of a structurant, and in some examples, from about 0.1% to about 2.0%, by weight of the composition, of a structurant. The structurant may be selected from the group consisting of diglycerides and triglycerides, ethylene glycol distearate, microcrystalline cellulose, cellulose-based materials, microfiber cellulose, biopolymers, xanthan gum, gellan gum, and mixtures thereof. In some examples, a suitable structurant includes hydrogenated castor oil, and non-ethoxylated derivatives thereof. Other suitable structurants are disclosed in U.S. Pat. No. 6,855,680. Such structurants have a thread-like structuring system having a range of aspect ratios. Further suitable structurants and the processes for making them are described in WO 2010/034736.

Suds Suppressors

Compounds for reducing or suppressing the formation of suds can be incorporated into the cleaning compositions described herein. Suds suppression can be of particular importance in the so-called "high concentration cleaning process" as described in U.S. Pat. Nos. 4,489,455, 4,489,574, and in front-loading style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430-447 (John Wiley & Sons, Inc., 1979). Examples of suds suppressors include monocarboxylic fatty acid, and soluble salts therein, high molecular weight hydrocarbons such as paraffin, fatty acid esters (e.g., fatty acid triglycerides), fatty acid esters of monovalent alcohols, aliphatic C18-C40 ketones (e.g., stearone), N-alkylated amino triazines, waxy hydrocarbons preferably having a melting point below about 100° C., silicone suds suppressors, and secondary alcohols. Suds suppressors are described in U.S. Pat. Nos. 2,954,347; 4,075,118; 4,265,779; 4,265,779; 3,455,839; 3,933,672; 4,652,392; 4,978,471; 4,983,316; 5,288,431; 4,639,489; 4,749,740; and 4,798,679.

The cleaning compositions herein may comprise from 0% to about 10%, by weight of the composition, of suds suppressor. When utilized as suds suppressors, monocarboxylic fatty acids, and salts thereof, may be present in amounts up to about 5% by weight of the cleaning composition, and in some examples, may be from about 0.5% to about 3% by weight of the cleaning composition. Silicone suds suppressors may be utilized in amounts up to about 2.0% by weight of the cleaning composition, although higher amounts may be used. Monostearyl phosphate suds suppressors may be utilized in amounts ranging from about 0.1% to about 2% by weight of the cleaning composition. Hydrocarbon suds suppressors may be utilized in amounts ranging from about 0.01% to about 5.0% by weight of the cleaning composition, although higher levels can be used. Alcohol suds suppressors may be used at about 0.2% to about 3% by weight of the cleaning composition.

Suds Boosters

If high sudsing is desired, suds boosters such as the C10-C16 alkanolamides may be incorporated into the cleaning compositions from about 1% to about 10% by weight of the cleaning composition. Some examples include the C10-C14 monoethanol and diethanol amides. If desired, water-soluble magnesium and/or calcium salts such as $MgCl_2$, $MgSO_4$, $CaCl_2$, $CaSO_4$, and the like, may be added at levels of about 0.1% to about 2% by weight of the cleaning composition, to provide additional suds and to enhance grease removal performance.

Fillers and Carriers

Fillers and carriers may be used in the cleaning compositions described herein. As used herein, the terms "filler" and "carrier" have the same meaning and can be used interchangeably. Liquid cleaning compositions, and other forms of cleaning compositions that include a liquid component (such as liquid-containing unit dose cleaning compositions), may contain water and other solvents as fillers or carriers. Low molecular weight primary or secondary alcohols exemplified by methanol, ethanol, propanol, isopropanol, and phenoxyethanol are suitable. Monohydric alcohols may be used in some examples for solubilizing surfactants, and polyols such as those containing from 2 to about 6 carbon atoms and from 2 to about 6 hydroxy groups (e.g., 1,2-propanediol, 1,3-propanediol, 2,3-butanediol, ethylene glycol, and glycerine may be used). Amine-containing solvents may also be used.

Methods of Use

The present invention includes methods for whitening fabric. Compact fluid detergent compositions that are suitable for sale to consumers are suited for use in laundry pretreatment applications, laundry cleaning applications, and home care applications. Such methods include, but are not limited to, the steps of contacting detergent compositions in neat form or diluted in wash liquor, with at least a portion of a fabric which may or may not be soiled and then optionally rinsing the fabric. The fabric material may be subjected to a washing step prior to the optional rinsing step. Machine laundry methods may comprise treating soiled laundry with an aqueous wash solution in a washing machine having dissolved or dispensed therein an effective amount of a machine laundry detergent composition in accord with the invention. An "effective amount" of the detergent composition means from about 20 g to about 300 g of product dissolved or dispersed in a wash solution of volume from about 5L to about 65L. The water temperatures may range from about 5° C. to about 100° C. The water to soiled material (e.g., fabric) ratio may be from about 1:1 to about 30:1. The compositions may be employed at concentrations of from about 500 ppm to about 15,000 ppm in solution. In the context of a fabric laundry composition, usage levels may also vary depending not only on the type and severity of the soils and stains, but also on the wash water temperature, the volume of wash water, and the type of washing machine (e.g., top-loading, front-loading, vertical-axis Japanese-type automatic washing machine).

The detergent compositions herein may be used for laundering of fabrics at reduced wash temperatures. These methods of laundering fabric comprise the steps of delivering a laundry detergent composition to water to form a wash liquor and adding a laundering fabric to said wash liquor, wherein the wash liquor has a temperature of from about 0° C. to about 20° C., or from about 0° C. to about 15° C., or from about 0° C. to about 9° C. The fabric may be contacted to the water prior to, or after, or simultaneous with, contacting the laundry detergent composition with water. Another method includes contacting a nonwoven substrate, which is impregnated with the detergent composition, with a soiled material. As used herein, "nonwoven substrate" can comprise any conventionally fashioned nonwoven sheet or web having suitable basis weight, caliper (thickness), absorbency, and strength characteristics. Non-limiting examples of suitable commercially available nonwoven substrates include those marketed under the trade names SONTARA® by DuPont and POLY WEB® by James River Corp.

Hand washing/soak methods, and combined hand washing with semi-automatic washing machines, are also included.

Packaging for the Compositions

The cleaning compositions described herein can be packaged in any suitable container including those constructed from paper, cardboard, plastic materials, and any suitable laminates. An optional packaging type is described in European Application No. 94921505.7.

Multi-Compartment Pouch

The cleaning compositions described herein may also be packaged as a multi-compartment cleaning composition.

Other Adjunct Ingredients

A wide variety of other ingredients may be used in the cleaning compositions herein, including, for example, other active ingredients, carriers, hydrotropes, processing aids, dyes or pigments, solvents for liquid formulations, solid or other liquid fillers, erythrosine, colliodal silica, waxes, probiotics, surfactin, aminocellulosic polymers, Zinc Ricinoleate, perfume microcapsules, rhamnolipds, sophorolipids, glycopeptides, methyl ester ethoxylates, sulfonated estolides, cleavable surfactants, biopolymers, silicones, modified silicones, aminosilicones, deposition aids, hydrotropes (especially cumene-sulfonate salts, toluene-sulfonate salts, xylene-sulfonate salts, and naphalene salts), PVA particle-encapsulated dyes or perfumes, pearlescent agents, effervescent agents, color change systems, silicone polyurethanes, opacifiers, tablet disintegrants, biomass fillers, fast-dry silicones, glycol distearate, starch perfume encapsulates, emulsified oils including hydrocarbon oils, polyolefins, and fatty esters, bisphenol antioxidants, micro-fibrous cellulose structurants, properfumes, styrene/acrylate polymers, triazines, soaps, superoxide dismutase, benzophenone protease inhibitors, functionalized TiO2, dibutyl phosphate, silica perfume capsules, and other adjunct ingredients, choline oxidase, triarylmethane blue and violet basic dyes, methine blue and violet basic dyes, anthraquinone blue and violet basic dyes, azo dyes basic blue 16, basic blue 65, basic blue 66 basic blue 67, basic blue 71, basic blue 159, basic violet 19, basic violet 35, basic violet 38, basic violet 48, oxazine dyes, basic blue 3, basic blue 75, basic blue 95, basic blue 122, basic blue 124, basic blue 141, Nile blue A and xanthene dye basic violet 10, an alkoxylated triphenylmethane polymeric colorant; an alkoxylated thiopene polymeric colorant; thiazolium dye, mica, titanium dioxide coated mica, bismuth oxychloride, and other actives.

Anti-oxidant: The composition may optionally contain an anti-oxidant present in the composition from about 0.001 to about 2% by weight. Preferably the antioxidant is present at a concentration in the range 0.01 to 0.08% by weight. Mixtures of anti-oxidants may be used.

One class of anti-oxidants used in the present invention is alkylated phenols. Hindered phenolic compounds are a preferred type of alkylated phenols having this formula. A preferred hindered phenolic compound of this type is 3,5-di-tert-butyl-4-hydroxytoluene (BHT).

Furthermore, the anti-oxidant used in the composition may be selected from the group consisting of α-, β-, γ-, δ—tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof.

The cleaning compositions described herein may also contain vitamins and amino acids such as: water soluble vitamins and their derivatives, water soluble amino acids and their salts and/or derivatives, water insoluble amino acids viscosity modifiers, dyes, nonvolatile solvents or diluents (water soluble and insoluble), pearlescent aids, pediculocides, pH adjusting agents, preservatives, skin active agents, sunscreens, UV absorbers, niacinamide, caffeine, and minoxidil.

The cleaning compositions of the present invention may also contain pigment materials such as nitroso, monoazo, disazo, carotenoid, triphenyl methane, triaryl methane, xanthene, quinoline, oxazine, azine, anthraquinone, indigoid, thionindigoid, quinacridone, phthalocianine, botanical, and natural colors, including water soluble components such as those having C.I. Names.

The cleaning compositions of the present invention may also contain antimicrobial agents. Cationic active ingredients may include but are not limited to n-alkyl dimethyl benzyl ammonium chloride, alkyl dimethyl ethyl benzyl ammonium chloride, dialkyl dimethyl quaternary ammonium compounds such as didecyl dimethyl ammonium chloride, N,N-didecyl-Nmethyl-poly(oxyethyl) ammonium propionate, dioctyl didecyl ammonium chloride, also including quaternary species such as benzethonium chloride and quaternary ammonium compounds with inorganic or organic counter ions such as bromine, carbonate or other moieties including dialkyl dimethyl ammonium carbonates, as well as antimicrobial amines such as Chlorhexidine Gluconate, PHMB (Polyhexamethylene biguanide), salt of a biguanide, a substituted biguanide derivative, an organic salt of a quaternary ammonium containing compound or an inorganic salt of a quaternary ammonium containing compound or mixtures thereof.

In one aspect, such method comprises the steps of optionally washing and/or rinsing said surface or fabric, contacting said surface or fabric with any composition disclosed in this specification then optionally washing and/or rinsing said surface or fabric is disclosed, with an optional drying step.

Drying of such surfaces or fabrics may be accomplished by any one of the common means employed either in domestic or industrial settings. The fabric may comprise any fabric capable of being laundered in normal consumer or institutional use conditions, and the invention is suitable for cellulosic substrates and in some aspects also suitable for synthetic textiles such as polyester and nylon and for treatment of mixed fabrics and/or fibers comprising synthetic and cellulosic fabrics and/or fibers. As examples of synthetic fabrics are polyester, nylon, these may be present in mixtures with cellulosic fibers, for example, polycotton fabrics. The solution typically has a pH of from 7 to 11, more usually 8 to 10.5. The compositions are typically employed at concentrations from 500 ppm to 5,000 ppm in solution. The water temperatures typically range from about 5° C. to about 90° C. The water to fabric ratio is typically from about 1:1 to about 30:1.

In a further embodiment, the invention provides a domestic method of treating a textile material, the method comprising the steps of (a) treating the textile material with an aqueous solution of the leuco polymer, (b) optionally, rinsing the textile material, and (c) optionally, drying the textile material.

The leuco polymer used in the domestic treatment method can be any of the leuco polymers described above in connection with the earlier embodiments of the invention. The leuco polymer can be present in the aqueous solution in any suitable amount. In one aspect, the aqueous solution comprises from about 10 ppb to about 5,000 ppm, preferably about 50 ppb to about 2 ppm, of the leuco polymer. In such an embodiment, the aqueous solution can further comprise a surfactant in an amount of from 0.0 g/L to about 6 g/L, preferably about 0.2 g/L to about 4 g/L. Further, the aqueous solution utilized in the domestic treatment method can be prepared by combining any of the laundry care compositions described above with a suitable amount of water. The domestic treatment method can be performed in any suitable apparatus, such as a sink or a domestic clothes washing machine.

The following examples further illustrate the subject matter described above but, of course, should not be construed as in any way limiting the scope thereof.

EXAMPLES

Preparation of Leuco Monomers

Preparation of Leuco Tosylate

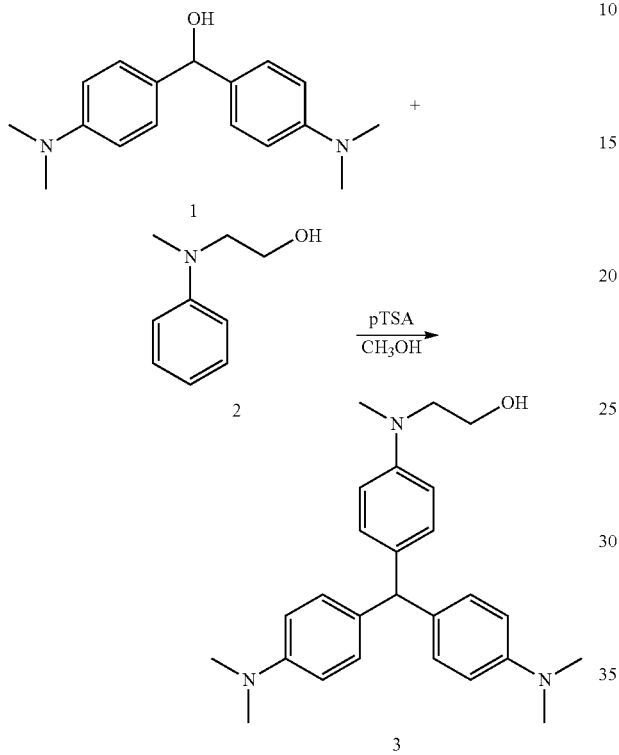

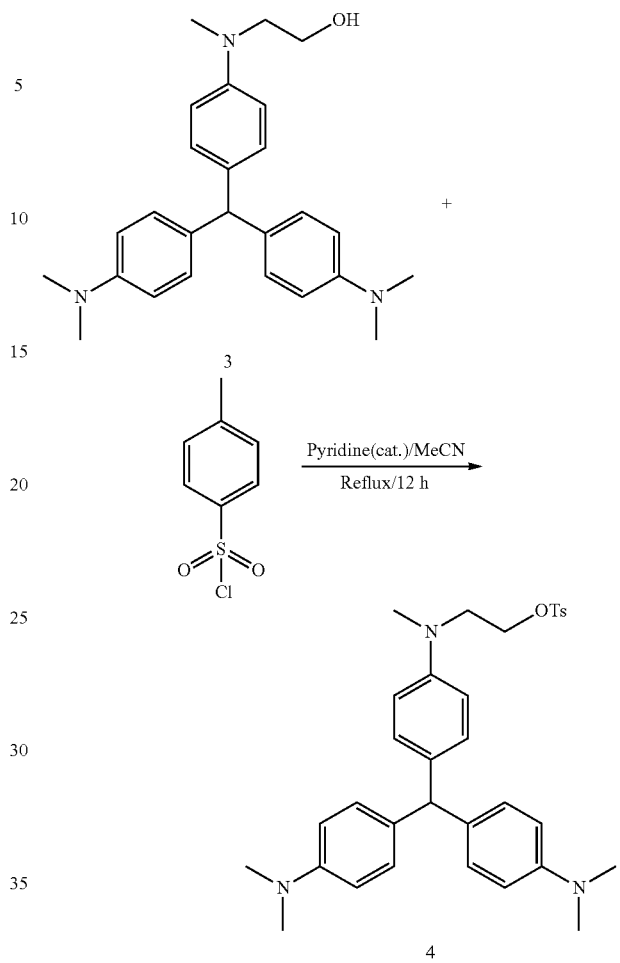

Leuco alcohol 3: A solution of 4,4'-bis(dimethylamino) benzhydrol (1) (0.27 g, 1.0 mmol), 2-(methylphenylamino) ethanol (2) (0.18 g, 1.2 mmol), and p-toluenesulfonic acid (pTSA) monohydrate (0.76 g, 4 mmol) in methanol (25 mL) is stirred at reflux with a Dean-Stark trap for 9 h. The mixture is diluted with methylene chloride and washed three times with aq. sodium bicarbonate. The organic layer is dried over anhydrous $MgSO_4$ and filtered. The filtrate is concentrated in vacuo to give a residue which is purified by column chromatography on silica gel (1:1 ethyl acetate/hexane) to yield the leuco alcohol intermediate 3.

Leuco tosylate 4: A solution of leuco alcohol (3) (5 g, 12.4 mmol), p-toluene sulfonyl chloride (2.6 g, 13.5 mmol), catalytic amount of pyridine (0.2 mL) in acetonitrile (50 mL) is refluxed for 12 h. The mixture is diluted with methylene chloride and washed three times with aq. sodium bicarbonate. The organic layer is dried over anhydrous $Na_2SO_4$ and filtered. The filtrate is concentrated in vacuo to give a residue which is purified by column chromatography on silica gel (1:1 ethyl acetate/hexane) to yield the leuco tosylate intermediate 4.

Preparation of Leuco Polymer 6

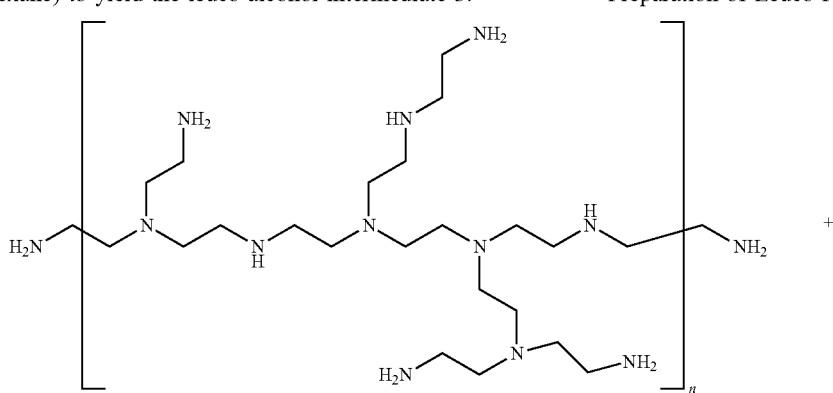

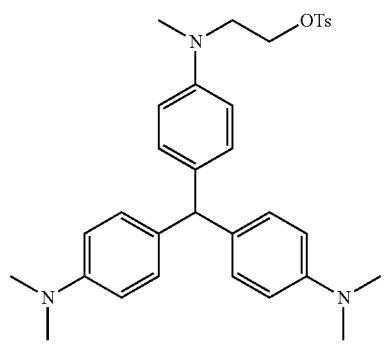

4

-continued

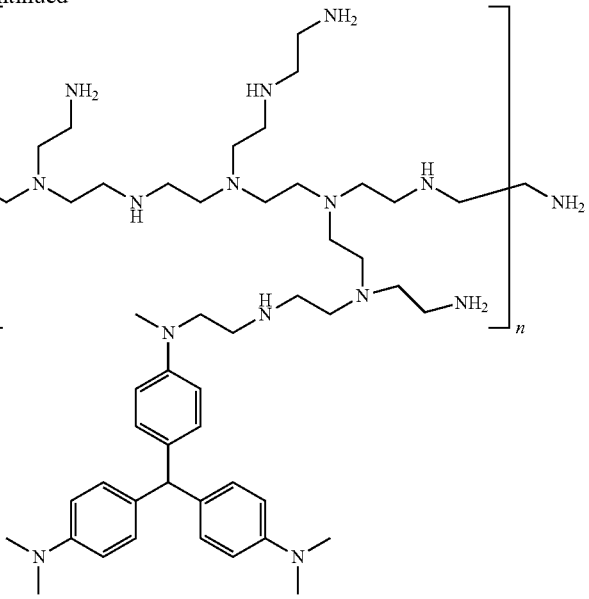

6

Leuco Polymer 6: A solution of Polyethylenimine, (branched, from Aldrich, average Mn=800 by GPC) (5) (5 g, 6.2 mmol), Leuco tosylate 4 (1 g, 1.8 mmol) in dichloroethane (20 mL) is heated at 65° C. for 12 h. The reaction is monitored using thin layer chromatography. Excess dichloroethane is evaporated in a rotary evaporator to obtain the leuco polymer 6.

Test Methods

Fabric swatches used in the test methods herein are obtained from Testfabrics, Inc. West Pittston, Pa., and are 100% Cotton, Style 403 (cut to 2"×2") and/or Style 464 (cut to 4"×6"), and an unbrightened multifiber fabric, specifically Style 41 (5 cm×10 cm).

All reflectance spectra and color measurements, including L*, a*, b*, K/S, and Whiteness Index (WI CIE) values on dry fabric swatches, are made using one of four spectrophotometers: (1) a Konica-Minolta 3610d reflectance spectrophotometer (Konica Minolta Sensing Americas, Inc., Ramsey, N.J., USA; D65 illumination, 10° observer, UV light excluded), (2) a LabScan XE reflectance spectrophotometer (HunterLabs, Reston, Va.; D65 illumination, 10° observer, UV light excluded), (3) a Color-Eye® 7000A (GretagMacbeth, New Windsor, N.Y., USA; D65 light, UV excluded), or (4) a Color i7 spectrophotometer (X-rite, Inc., Grand Rapids, Mich., USA; D65 light, UV excluded). Measurements are performed using two layers of fabric, obtained by stacking smaller internal replicates (e.g., 2"×2" Style 403) or folding of larger fabric swatches (e.g., 4"×6" style 464).

Where fabrics are irradiated, unless otherwise indicated, the specified fabrics post-dry are exposed to simulated sunlight with irradiance of 0.77 W/m² @ 420 nm in an Atlas Xenon Fade-Ometer Ci3000+ (Atlas Material Testing Technology, Mount Prospect, Ill., USA) equipped with Type S Borosilicate inner (Part no. 20277300) and outer (Part no. 20279600) filters, set at 37° C. maximum cabinet temperature, 57° C. maximum black panel temperature (BPT black panel geometry), and 35% RH (relative humidity). Unless otherwise indicated, irradiation is continuous over the stated duration.

I. Method for Determining Leuco Compound Efficiency from a Wash Solution

Cotton swatches (Style 403) are stripped prior to use by washing at 49° C. two times with heavy duty liquid laundry detergent nil brightener (1.55 g/L in aqueous solution). A concentrated stock solution of each leuco polymer to be tested is prepared in a solvent selected from ethanol or 50:50 ethanol:water, preferably ethanol.

A base wash solution is prepared by dissolving heavy duty liquid laundry detergent nil brightener (5.23 g/1.0 L) in deionized water. Four stripped cotton swatches are weighed together and placed in a 250 mL Erlenmeyer flask along with two 10mm glass marbles. A total of three such flasks are prepared for each wash solution to be tested. The base wash solution is dosed with the leuco polymer stock to achieve a wash solution with the desired $2.0 \times 10^{-6}$ N wash concentration of leuco moieties. (By way of example, a 1.0 ppm wash solution of a leuco polymer with equivalent weight of 493.65 g/equivalent leuco moiety, or a 1.5 ppm wash solution of a leuco colorant with equivalent weight of 757.97 g/equivalent leuco moiety, provides a wash solution that is $2.0 \times 10^{-6}$ N in leuco moiety.)

An aliquot of this wash solution sufficient to provide a 10.0:1.0 liquor:fabric (w/w) ratio is placed into each of the three 250 mL Erlenmeyer flasks. Each flask is dosed with a 1000 gpg stock hardness solution to achieve a final wash hardness of 6 gpg (3:1 Ca:Mg).

The flasks are placed on a Model 75 wrist action shaker (Burrell Scientific, Inc., Pittsburg, Pa.) and agitated at the maximum setting for 12 minutes, after which the wash solution is removed by aspiration, a volume of rinse water (0 gpg) equivalent to the amount of wash solution used is added. Each flask is dosed with a 1000 gpg stock hardness solution to achieve a final rinse hardness of 6 gpg (3:1 Ca:Mg) before agitating 4 more minutes. The rinse is removed by aspiration and the fabric swatches are spun dry (Mini Countertop Spin Dryer, The Laundry Alternative Inc., Nashua, N.H.) for 1 minute, then placed in a food dehydrator set at 135° F. to dry in the dark for 2 hours.

A. Dark Conditions Post-dry

L*, a*, b*, and Whiteness Index (WI CIE) values for the cotton fabrics are measured on the dry swatches 48 hours following the drying procedure using a LabScan XE reflectance spectrophotometer. The L*, a*, and b* values of the 12 swatches generated for each leuco compound (three flasks with four swatches each) are averaged and the leuco compound efficiency (LCE) of each leuco compound is calculated using the following equation:

$$LCE = DE^* = [(L^*_c - L^*_s)^2 + (a^*_c - a^*_s)^2 + (b^*_c - b^*_s)^2]^{1/2}$$

wherein the subscripts c and s respectively refer to the control, i.e., the fabric washed in detergent with no leuco polymer, and the sample, i.e., the fabric washed in detergent containing leuco polymer.

The WI CIE values of the 12 swatches generated for each wash solution (three flasks with four swatches each) are averaged and the change in whiteness index on washing is calculated using the following equation:

$$\Delta WI = WI\ CIE\ (after\ wash) - WI\ CIE\ (before\ wash)$$

B. Light Conditions Post-dry

Because consumer habits vary greatly throughout the world, the methods used must allow for the possibility of measuring the benefits of leuco compounds across conditions. One such condition is the exposure to light following drying. Some leuco compounds will not exhibit as large a benefit under dark storage as under light storage, so each leuco compound must be tested under both sets of conditions to determine the optimum benefit. Therefore Method I includes exposure of the dried fabrics to simulated sunlight for various increments of time before measurements are taken, and the LCE value is set to the maximum value obtained from the set of exposure times described below.

The specified cotton fabrics post-dry are exposed to simulated sunlight for 15 min, 30 min, 45 min, 60 min, 75 min, 90 min, 120 min, and 240 min. The L*, a*, b*, and Whiteness Index (WI CIE) values for the cotton fabrics are measured on the swatches after each exposure period using a LabScan XE reflectance spectrophotometer. The calculation of the LCE and the $\Delta WI$ value at each exposure time point is as described in Method I.A. above, and the LCE value and the $\Delta WI$ value for the leuco compound are set to the maximum values obtained from the set of exposure times listed.

II. Method for Determining Relative Hue Angle (vs. Nil Leuco Compound)

The relative hue angle delivered by a leuco compound to cotton fabrics treated according to Method I described above is determined as follows.

a) The a* and b* values of the 12 swatches from each solution are averaged and the following formulas used to determine $\Delta a^*$ and $\Delta b^*$:

$$\Delta a^* = a^*_s - a^*_c \text{ and } \Delta b^* = b^*_s - b^*_c$$

wherein the subscripts c and s respectively refer to the fabric washed in detergent with no leuco compound and the fabric washed in detergent containing leuco compound.

b) If the absolute value of both $\Delta a^*$ and $\Delta b^*$ <0.25, no Relative Hue Angle (RHA) is calculated. If the absolute value of either $\Delta a^*$ or $\Delta b^*$ is $\geq 0.25$, the RHA is determined using one of the following formulas:

$$RHA = ATAN2(\Delta a^*, \Delta b^*) \text{ for } \Delta b^* \geq 0$$

$$RHA = 360 + ATAN2(\Delta a^*, \Delta b^*) \text{ for } \Delta b^* < 0$$

A relative hue angle can be calculated for each time point where data is collected in either the dark post-dry or light post-dry assessments. Any of these points may be used to satisfy the requirements of a claim.

III. Method for Determining Change in Whiteness Index for a Laundry Care Formulation Cotton swatches (Style 403) are stripped prior to use by washing at 49° C. two times with heavy duty liquid laundry detergent nil brightener (1.55 g/L in aqueous solution).

A base wash solution is prepared by dissolving the laundry care formulation (5.23 g/1.0 L) in deionized water. Four stripped cotton swatches are weighed together and placed in a 250 mL Erlenmeyer flask along with two 10 mm glass marbles. A total of three such flasks are prepared.

An aliquot of this wash solution sufficient to provide a 10.0:1.0 liquor:fabric (w/w) ratio is placed into each of the three 250 mL Erlenmeyer flasks. Each flask is dosed with a 1000 gpg stock hardness solution to achieve a final wash hardness of 6 gpg (3:1 Ca:Mg).

The flasks are placed on a Model 75 wrist action shaker (Burrell Scientific, Inc., Pittsburg, Pa.) and agitated at the maximum setting for 12 minutes, after which the wash solution is removed by aspiration, a volume of rinse water (0 gpg) equivalent to the amount of wash solution used is added. Each flask is dosed with a 1000 gpg stock hardness solution to achieve a final rinse hardness of 6 gpg (3:1 Ca:Mg) before agitating 4 more minutes. The rinse is removed by aspiration and the fabric swatches are spun dry (Mini Countertop Spin Dryer, The Laundry Alternative Inc., Nashua, N.H.) for 1 minute, then placed in a food dehydrator set at 135° F. to dry in the dark for 2 hours.

L*, a*, b*, and Whiteness Index (WI CIE) values for the cotton fabrics are measured on the dry swatches, according to Method I.A. and/or I.B. above, using a LabScan XE reflectance spectrophotometer. The WI CIE values of the 12 swatches generated for the laundry care formulation (three flasks with four swatches each) are averaged and the change in whiteness index on washing is calculated using the following equation:

$$\Delta WI = WI\ CIE\ (after\ wash) - WI\ CIE\ (before\ wash)$$

Formulation Examples

The following are illustrative examples of cleaning compositions according to the present disclosure and are not intended to be limiting.

Examples 1-7

Heavy Duty Liquid Laundry Detergent Compositions

| Ingredients | 1 | 2 | 3 | 4 | 5 | 6 | 7 |
|---|---|---|---|---|---|---|---|
| | % weight | | | | | | |
| $AE_{1.8}S$ | 6.77 | 5.16 | 1.36 | 1.30 | — | — | — |
| $AE_3S$ | — | — | — | — | 0.45 | — | — |
| LAS | 0.86 | 2.06 | 2.72 | 0.68 | 0.95 | 1.56 | 3.55 |
| HSAS | 1.85 | 2.63 | 1.02 | — | — | — | — |

| Ingredients | 1 | 2 | 3 | 4 % weight | 5 | 6 | 7 |
|---|---|---|---|---|---|---|---|
| AE9 | 6.32 | 9.85 | 10.20 | 7.92 | — | — | — |
| AE8 | — | — | — | — | — | — | 35.45 |
| AE7 | — | — | — | — | 8.40 | 12.44 | — |
| $C_{12-14}$ dimethyl Amine Oxide | 0.30 | 0.73 | 0.23 | 0.37 | — | — | — |
| $C_{12-18}$ Fatty Acid | 0.80 | 1.90 | 0.60 | 0.99 | 1.20 | — | 15.00 |
| Citric Acid | 2.50 | 3.96 | 1.88 | 1.98 | 0.90 | 2.50 | 0.60 |
| Optical Brightener 1 | 1.00 | 0.80 | 0.10 | 0.30 | 0.05 | 0.50 | 0.001 |
| Optical Brightener 3 | 0.001 | 0.05 | 0.01 | 0.20 | 0.50 | — | 1.00 |
| Sodium formate | 1.60 | 0.09 | 1.20 | 0.04 | 1.60 | 1.20 | 0.20 |
| DTI | 0.32 | 0.05 | — | 0.60 | — | 0.60 | 0.01 |
| Sodium hydroxide | 2.30 | 3.80 | 1.70 | 1.90 | 1.70 | 2.50 | 2.30 |
| Monoethanolamine | 1.40 | 1.49 | 1.00 | 0.70 | — | — | — |
| Diethylene glycol | 5.50 | — | 4.10 | — | — | — | — |
| Chelant 1 | 0.15 | 0.15 | 0.11 | 0.07 | 0.50 | 0.11 | 0.80 |
| 4-formyl-phenylboronic acid | — | — | — | — | 0.05 | 0.02 | 0.01 |
| Sodium tetraborate | 1.43 | 1.50 | 1.10 | 0.75 | — | 1.07 | — |
| Ethanol | 1.54 | 1.77 | 1.15 | 0.89 | — | 3.00 | 7.00 |
| Polymer 1 | 0.10 | — | — | — | — | — | 2.00 |
| Polymer 2 | 0.30 | 0.33 | 0.23 | 0.17 | — | — | — |
| Polymer 3 | — | — | — | — | — | — | 0.80 |
| Polymer 4 | 0.80 | 0.81 | 0.60 | 0.40 | 1.00 | 1.00 | — |
| 1,2-Propanediol | — | 6.60 | — | 3.30 | 0.50 | 2.00 | 8.00 |
| Structurant | 0.10 | — | — | — | — | — | 0.10 |
| Perfume | 1.60 | 1.10 | 1.00 | 0.80 | 0.90 | 1.50 | 1.60 |
| Perfume encapsulate | 0.10 | 0.05 | 0.01 | 0.02 | 0.10 | 0.05 | 0.10 |
| Protease | 0.80 | 0.60 | 0.70 | 0.90 | 0.70 | 0.60 | 1.50 |
| Mannanase | 0.07 | 0.05 | 0.045 | 0.06 | 0.04 | 0.045 | 0.10 |
| Amylase 1 | 0.30 | — | 0.30 | 0.10 | — | 0.40 | 0.10 |
| Amylase 2 | — | 0.20 | 0.10 | 0.15 | 0.07 | — | 0.10 |
| Xyloglucanase | 0.20 | 0.10 | — | — | 0.05 | 0.05 | 0.20 |
| Lipase | 0.40 | 0.20 | 0.30 | 0.10 | 0.20 | — | — |
| Polishing enzyme | — | 0.04 | — | — | — | 0.004 | — |
| Nuclease | 0.05 | — | — | — | — | — | 0.003 |
| Dispersin B | — | — | — | 0.05 | 0.03 | 0.001 | 0.001 |
| Liquitint® V200 | 0.01 | — | — | — | — | — | 0.005 |
| Leuco polymer | 0.5 | 0.35 | 0.1 | 0.2 | 0.04 | 0.02 | 0.04 |
| Dye control agent | — | 0.3 | — | 0.03 | — | 0.3 | 0.3 |
| Water, dyes & minors | | | | Balance | | | |
| pH | | | | 8.2 | | | |

Based on total cleaning and/or treatment composition weight. Enzyme levels are reported as raw material.

Examples 8 to 18

Unit Dose Compositions

These examples provide various formulations for unit dose laundry detergents. Compositions 8 to 12 comprise a single unit dose compartment. The film used to encapsulate the compositions is polyvinyl-alcohol-based film.

| Ingredients | 8 | 9 | 10 % weight | 11 | 12 |
|---|---|---|---|---|---|
| LAS | 19.09 | 16.76 | 8.59 | 6.56 | 3.44 |
| AE3S | 1.91 | 0.74 | 0.18 | 0.46 | 0.07 |
| AE7 | 14.00 | 17.50 | 26.33 | 28.08 | 31.59 |
| Citric Acid | 0.6 | 0.6 | 0.6 | 0.6 | 0.6 |
| C12-15 Fatty Acid | 14.8 | 14.8 | 14.8 | 14.8 | 14.8 |
| Polymer 3 | 4.0 | 4.0 | 4.0 | 4.0 | 4.0 |
| Chelant 2 | 1.2 | 1.2 | 1.2 | 1.2 | 1.2 |
| Optical Brightener 1 | 0.20 | 0.25 | 0.01 | 0.01 | 0.50 |
| Optical Brightener 2 | 0.20 | — | 0.25 | 0.03 | 0.01 |
| Optical Brightener 3 | 0.18 | 0.09 | 0.30 | 0.01 | — |
| DTI | 0.10 | — | 0.20 | — | — |
| Glycerol | 6.1 | 6.1 | 6.1 | 6.1 | 6.1 |
| Monoethanol amine | 8.0 | 8.0 | 8.0 | 8.0 | 8.0 |
| Tri-isopropanol amine | — | — | 2.0 | — | — |
| Tri-ethanol amine | — | 2.0 | — | — | — |
| Cumene sulfonate | — | — | — | — | 2.0 |
| Protease | 0.80 | 0.60 | 0.07 | 1.00 | 1.50 |
| Mannanase | 0.07 | 0.05 | 0.05 | 0.10 | 0.01 |
| Amylase 1 | 0.20 | 0.11 | 0.30 | 0.50 | 0.05 |
| Amylase 2 | 0.11 | 0.20 | 0.10 | — | 0.50 |
| Polishing enzyme | 0.005 | 0.05 | — | — | — |
| Nuclease | 0.— | 0.05 | — | — | 0.005 |
| Dispersin B | 0.010 | 0.05 | 0.005 | 0.005 | — |
| Cyclohexyl dimethanol | — | — | — | 2.0 | — |
| Leuco polymer | 0.6 | 0.3 | 1.0 | 0.1 | 0.4 |
| Liquitint® V200 | — | — | 0.01 | 0.05 | — |
| Structurant | 0.14 | 0.14 | 0.14 | 0.14 | 0.14 |
| Perfume | 1.9 | 1.9 | 1.9 | 1.9 | 1.9 |
| Dye control agent | 0.1 | 0.3 | 0.2 | 0.5 | 0.3 |
| Water and miscellaneous | | | To 100% | | |
| pH | | | 7.5-8.2 | | |

Based on total cleaning and/or treatment composition weight. Enzyme levels are reported as raw material.

In the following examples the unit dose has three compartments, but similar compositions can be made with two, four or five compartments. The film used to encapsulate the compartments is polyvinyl alcohol.

| Ingredients | Base compositions | | | |
|---|---|---|---|---|
| | 13 | 14 | 15 | 16 |
| | % weight | | | |
| HLAS | 26.82 | 16.35 | 7.50 | 3.34 |
| AE7 | 17.88 | 16.35 | 22.50 | 30.06 |
| Citric Acid | 0.5 | 0.7 | 0.6 | 0.5 |
| C12-15 Fatty acid | 16.4 | 6.0 | 11.0 | 13.0 |
| Polymer 1 | 2.9 | 0.1 | — | — |
| Polymer 3 | 1.1 | 5.1 | 2.5 | 4.2 |
| Cationic cellulose polymer | — | — | 0.3 | 0.5 |
| Polymer 6 | — | 1.5 | 0.3 | 0.2 |
| Chelant 2 | 1.1 | 2.0 | 0.6 | 1.5 |
| Optical Brightener 1 | 0.20 | 0.25 | 0.01 | 0.005 |
| Optical Brightener 3 | 0.18 | 0.09 | 0.30 | 0.005 |
| DTI | 0.1 | — | 0.05 | — |
| Glycerol | 5.3 | 5.0 | 5.0 | 4.2 |
| Monoethanolamine | 10.0 | 8.1 | 8.4 | 7.6 |
| Polyethylene glycol | — | — | 2.5 | 3.0 |
| Potassium sulfite | 0.2 | 0.3 | 0.5 | 0.7 |
| Protease | 0.80 | 0.60 | 0.40 | 0.80 |
| Amylase 1 | 0.20 | 0.20 | 0.200 | 0.30 |
| Polishing enzyme | — | — | 0.005 | 0.005 |
| Nuclease | 0.05 | — | — | — |
| Dispersin B | — | 0.010 | 0.010 | 0.010 |
| MgCl$_2$ | 0.2 | 0.2 | 0.1 | 0.3 |
| Structurant | 0.2 | 0.1 | 0.2 | 0.2 |
| Acid Violet 50 | 0.04 | 0.03 | 0.05 | 0.03 |
| Perfume/encapsulates | 0.10 | 0.30 | 0.01 | 0.05 |
| Dye control agent | 0.2 | 0.03 | 0.4 | — |
| Solvents and misc. | To 100% | | | |
| pH | 7.0-8.2 | | | |

| | Finishing compositions | | | | | |
|---|---|---|---|---|---|---|
| | 17 | | | 18 | | |
| | Compartment | | | | | |
| | A | B | C | A | B | C |
| | Volume of each compartment | | | | | |
| | 40 ml | 5 ml | 5 ml | 40 ml | 5 ml | 5 ml |
| Ingredients | Active material in Wt. % | | | | | |
| Perfume | 1.6 | 1.6 | 1.6 | 1.6 | 1.6 | 1.6 |
| Liquitint ® V200 | 0 | 0.006 | 0 | 0 | 0.004 | — |
| Leuco polymer | — | 0.2 | — | 0.4 | — | — |
| TiO2 | — | — | 0.1 | — | — | 0.1 |
| Sodium Sulfite | 0.4 | 0.4 | 0.4 | 0.1 | 0.3 | 0.3 |
| Polymer 5 | — | 2 | — | — | — | — |
| Hydrogenated castor oil | 0.14 | 0.14 | 0.14 | 0.14 | 0.14 | 0.14 |
| Base Composition 13, 14, 15 or 16 | Add to 100% | | | | | |

Based on total cleaning and/or treatment composition weight, enzyme levels are reported as raw material.

| | |
|---|---|
| AE1.8S | is $C_{12-15}$ alkyl ethoxy (1.8) sulfate |
| AE3S | is $C_{12-15}$ alkyl ethoxy (3) sulfate |
| AE7 | is $C_{12-13}$ alcohol ethoxylate, with an average degree of ethoxylation of 7 |
| AE8 | is $C_{12-13}$ alcohol ethoxylate, with an average degree of ethoxylation of 8 |
| AE9 | is $C_{12-13}$ alcohol ethoxylate, with an average degree of ethoxylation of 9 |
| Amylase 1 | is Stainzyme ®, 15 mg active/g, supplied by Novozymes |
| Amylase 2 | is Natalase ®, 29 mg active/g, supplied by Novozymes |
| Xyloglucanase | is Whitezyme ®, 20 mg active/g, supplied by Novozymes |
| Chelant 1 | is diethylene triamine pentaacetic acid |
| Chelant 2 | is 1-hydroxyethane 1,1-diphosphonic acid |
| Dispersin B | is a glycoside hydrolase, reported as 1000 mg active/g |
| DTI | is either poly(4-vinylpyridine-1-oxide) (such as Chromabond S-403E ®), or poly(1-vinylpyrrolidone-co-1-vinylimidazole) (such as Sokalan HP56 ® ). |
| Dye control agent | Dye control agent in accordance with the invention, for example Suparex ® O.IN (M1), Nylofixan ® P (M2), Nylofixan ® PM (M3), or Nylofixan ® HF (M4) |
| HSAS | is mid-branched alkyl sulfate as disclosed in U.S. Pat. No. 6,020,303 and U.S. Pat. No. 6,060,443 |
| LAS | is linear alkylbenzenesulfonate having an average aliphatic carbon chain length $C_9$-$C_{15}$ (HLAS is acid form). |
| Leuco colorant | Any suitable leuco colorant or mixtures thereof according to the instant invention. |
| Lipase | is Lipex ®, 18 mg active/g, supplied by Novozymes |
| Liquitint ® V200 | is a thiophene azo dye provided by Milliken |
| Mannanase | is Mannaway ®, 25 mg active/g, supplied by Novozymes |
| Nuclease | is a Phosphodiesterase SEQ ID NO 1, reported as 1000 mg active/g |
| Optical Brightener 1 | is disodium 4,4'-bis{[4-anilino-6-morpholino-s-triazin-2-yl]-amino}-2,2'-stilbenedisulfonate |
| Optical Brightener 2 | is disodium 4,4'-bis-(2-sulfostyryl)biphenyl (sodium salt) |
| Optical Brightener 3 | is Optiblanc SPL10 ® from 3V Sigma |
| Perfume encapsulate | is a core-shell melamine formaldehyde perfume microcapsules. |
| Polishing enzyme | is Para-nitrobenzyl esterase, reported as 1000 mg active/g |
| Polymer 1 | is bis$((C_2H_5O)(C_2H_4O)n)(CH_3)$—$N^+$—$C_xH_{2x}$—$N^+$—$(CH_3)$—bis$((C_2H_5O)(C_2H_4O)n)$, wherein n = 20-30, x = 3 to 8 or sulphated or sulfonated variants thereof |
| Polymer 2 | is ethoxylated ($EO_{15}$) tetraethylene pentamine |
| Polymer 3 | is ethoxylated polyethylenimine |
| Polymer 4 | is ethoxylated hexamethylene diamine |
| Polymer 5 | is Acusol 305, provided by Rohm&Haas |
| Polymer 6 | is a polyethylene glycol polymer grafted with vinyl acetate side chains, provided by BASF. |
| Protease | is Purafect Prime ®, 40.6 mg active/g, supplied by DuPont |
| Structurant | is Hydrogenated Castor Oil |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A laundry care composition comprising:
   (i) from 2 to 70 wt % of a surfactant; and
   (ii) from 0.0001 to 20.0 wt % of a leuco polymer comprising a polyamine covalently bound to a leuco moiety,
   wherein the polyamine is an alkoxylated polyethyleneimine comprising at least one ethoxylated group containing from 10 to 20 —CH$_2$CH$_2$O— repeating units,
   wherein the leuco compositon is a compound according to formula (I)

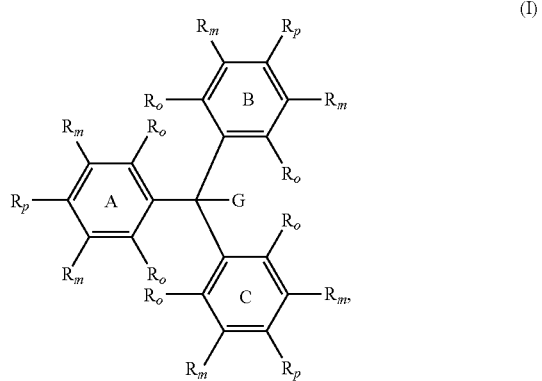

wherein the ratio of Formula I to its oxidized form is at least 1:3; wherein each individual $R_o$, $R_m$ and $R_p$ group on each of rings A, B and C is independently selected from the group consisting of hydrogen, deuterium and $R^5$; wherein each $R^5$ is independently selected from the group consisting of halogens, nitro, alkyl, substituted alkyl, aryl, substituted aryl, alkaryl, substituted alkaryl, —C(O)R$^1$, —C(O)OR$^1$, —C(O)O$^{31}$, —C(O)NR$^1$R$^2$, —OC(O)R$^1$, —OC(O)OR$^1$, —OC(O)NR$^1$R$^2$, —S(O)$_2$R$^1$, —S(O)$_2$OR$^1$, —S(O)$_2$O$^{31}$, —S(O)$_2$NR$^1$R$^2$, —NR$^1$C(O)R$^2$, —NR$^1$C(O)OR$^2$, —NR$^1$C(O)SR$^2$, —NR$^1$C(O)NR$^2$R$^3$, —OR$^1$, —NR$^1$R$^2$, —P(O)$_2$R$^1$, —P(O)(OR$^1$)$_2$, —P(O)(OR$^1$)O$^{31}$, and —P(O)(O$^{31}$)$_2$;

wherein all of the $R_o$ and $R_m$ groups on all three rings A, B or C are hydrogen;

wherein G is hydrogen;

wherein R$^1$, R$^2$ and R$^3$ are independently selected from the group consisting of hydrogen, alkyl, substituted alkyl, aryl, substituted aryl, alkaryl, substituted alkaryl, and R$^4$; R$^4$ is a organic group composed of one or more organic monomers with said monomer molecular weights ranging from 28 to 500;

wherein any charge present in any of the compounds is balanced with a suitable independently selected internal or external counterion.

2. A laundry care composition according to claim 1, wherein at least one ethoxylated group on said ethoxylated polyethyleneimine contains from 5 to 9 —CH$_2$CH$_2$O— repeating units.

3. A laundry care composition according to claim 1, further comprising an antioxidant.

4. A laundry care composition according to claim 1, wherein the molecular weight of the leuco polymer is from 2000 to 30000.

5. The laundry care composition of claim 1, wherein all three $R_p$ are —NR$_1$R$_2$.

6. A method of treating a textile, the method comprising the steps of:
   (i) treating a textile with an aqueous solution of the leuco polymer as defined in claim 1, the aqueous solution comprising from 10 ppb to 5000 ppm of the leuco polymer; and from greater than 0.0 g/L to 3 g/L of a surfactant,
   (ii) optionally rinsing the textile, and
   (iii) drying the textile.

* * * * *